United States Patent
Khandekar et al.

(10) Patent No.: US 9,432,991 B2
(45) Date of Patent: Aug. 30, 2016

(54) ENABLING SUPPORT FOR TRANSPARENT RELAYS IN WIRELESS COMMUNICATION

(75) Inventors: Aamod Dinkar Khandekar, San Diego, CA (US); Ravi Palanki, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 12/763,742

(22) Filed: Apr. 20, 2010

(65) Prior Publication Data

US 2010/0265842 A1    Oct. 21, 2010

Related U.S. Application Data

(60) Provisional application No. 61/171,374, filed on Apr. 21, 2009.

(51) Int. Cl.
| | |
|---|---|
| H04W 72/00 | (2009.01) |
| H04B 7/14 | (2006.01) |
| H04W 72/04 | (2009.01) |
| H04B 7/26 | (2006.01) |

(Continued)

(52) U.S. Cl.
CPC ........ *H04W 72/0433* (2013.01); *H04B 7/2606* (2013.01); *H04W 72/121* (2013.01); *H04W 72/1289* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 6,965,772 B1 * | 11/2005 | Mohebbi et al. | ............. 455/442 |
| 7,061,890 B2 | 6/2006 | Kim et al. | |

(Continued)

FOREIGN PATENT DOCUMENTS

| | | |
|---|---|---|
| CN | 1938995 A | 3/2007 |
| CN | 101356748 A | 1/2009 |

(Continued)

OTHER PUBLICATIONS

Christian Tchepnda., et al., "Hybrid Wireless Networks: Applications, Architectures and New Perspectives", 2006 3rd Annual IEEE Communications Society Conference on Sensor and Ad Hoc Communications and Networks—Sep. 25-28, 2006—Reston, VA, USA, IEEE, Piscataway, NJ, USA, Jan. 1, 2006, pp. 848-853, XP031012276, ISBN: 978-1-4244-0626-5 p. 849, paragraph I-p. 850, paragraph II.

(Continued)

*Primary Examiner* — Steve Young

(57) ABSTRACT

Providing for improved implementation of supplemental wireless nodes in a wireless base station deployment is described herein. By way of example, a donor base station is configured to send a schedule of data transmission to and from a set of UEs served by the base station, and further can provide the schedule and identifiers for the set of UEs to one or more wireless nodes serving the base station. Respective access channel measurements between respective UEs and respective wireless nodes can be forwarded to the base station, which in turn can identify optimal access channels for the set of UEs. Additionally, the donor base station can schedule multiple data transmissions on these access channels in a common transmission time slot, to achieve cell-splitting gains for the data transmissions. Range boosting, differential coding, and supplemental channel quality mechanisms are also provided for various wireless communication arrangements described herein.

44 Claims, 14 Drawing Sheets

(51) Int. Cl.
 *H04W 72/12* (2009.01)
 *H04W 84/04* (2009.01)

(56) References Cited

U.S. PATENT DOCUMENTS

| | | | | |
|---|---|---|---|---|
| 8,000,282 | B2* | 8/2011 | Chindapol et al. | 370/315 |
| 8,050,235 | B2* | 11/2011 | Kang | H04B 7/026 370/315 |
| 8,442,531 | B2* | 5/2013 | Doppler | H04L 1/04 370/331 |
| 8,446,851 | B2* | 5/2013 | Gou | H04B 7/155 370/312 |
| 2006/0280147 | A1 | 12/2006 | Rizvi et al. | |
| 2007/0258540 | A1 | 11/2007 | Ratasuk et al. | |
| 2008/0025247 | A1 | 1/2008 | McBeath et al. | |
| 2008/0045212 | A1* | 2/2008 | Kim et al. | 455/435.1 |
| 2008/0108305 | A1* | 5/2008 | Lin et al. | 455/11.1 |
| 2008/0108369 | A1* | 5/2008 | Visotsky et al. | 455/455 |
| 2008/0165719 | A1 | 7/2008 | Visotsky | |
| 2008/0171551 | A1 | 7/2008 | Zhu et al. | |
| 2008/0207117 | A1 | 8/2008 | Lim et al. | |
| 2008/0247478 | A1* | 10/2008 | Lee | H04L 5/0007 375/260 |
| 2009/0088164 | A1* | 4/2009 | Shen et al. | 455/436 |
| 2009/0141676 | A1* | 6/2009 | Maheshwari | H04L 1/1812 370/329 |
| 2009/0185479 | A1* | 7/2009 | Hart | H04B 7/026 370/218 |
| 2009/0254790 | A1* | 10/2009 | Pi et al. | 714/749 |
| 2009/0262678 | A1* | 10/2009 | Oyman | H04B 7/024 370/315 |
| 2010/0080153 | A1* | 4/2010 | Kahn et al. | 370/310 |
| 2010/0097932 | A1* | 4/2010 | Wu | 370/235 |
| 2010/0232345 | A1* | 9/2010 | Tsai | H04B 7/15528 370/315 |
| 2010/0315989 | A1* | 12/2010 | Reznik | H04B 7/15557 370/315 |
| 2010/0323614 | A1* | 12/2010 | Yu | H04B 7/155 455/9 |
| 2012/0287882 | A1* | 11/2012 | Kim | H04L 5/0048 370/329 |

FOREIGN PATENT DOCUMENTS

| | | |
|---|---|---|
| EP | 1855492 A1 | 11/2007 |
| EP | 1912390 A1 | 4/2008 |
| GB | 2445004 A | 6/2008 |
| JP | 2006523072 A | 10/2006 |
| JP | 2006340372 A | 12/2006 |
| JP | 2007074304 A | 3/2007 |
| JP | 2007267245 A | 10/2007 |
| JP | 2007306572 A | 11/2007 |
| JP | 2008172762 A | 7/2008 |
| JP | 2009535995 A | 10/2009 |
| JP | 2010512043 A | 4/2010 |
| JP | 2010532973 A | 10/2010 |
| WO | 0193462 A1 | 12/2001 |
| WO | 2004091114 A1 | 10/2004 |
| WO | WO2007039757 A2 | 4/2007 |
| WO | WO-2007039757 A3 | 6/2007 |
| WO | WO-2007083219 A2 | 7/2007 |
| WO | WO2008062200 A2 | 5/2008 |
| WO | 2008066432 A1 | 6/2008 |
| WO | WO2009009511 A2 | 1/2009 |

OTHER PUBLICATIONS

Faghih-Imani S., et al.,"Interference modeling and generalized static capacity for uplink CDMA cellular networks", Telecommunications and Malaysia International Conference on Communications, 2007. ICT-MICC 2007. IEEE International Conference on, IEEE, Piscataway, NJ, USA, May 14, 2007, pp. 17-22, XP031228698, ISBN: 978-1-4244-1093-4 p. 18, paragraph II.
International Search Report—PCT/US2010/031957—ISAEPO—Dec. 16, 2010.
Written Opinion—PCT/US2010/031957—ISA/EPO—Dec. 16, 2010.
Taiwan Search Report—TW099112575—TIPO—Mar. 4, 2014.
Bell, et al., "Relaying for LTE-Advanced", 3GPP Draft; R1-090066, Relaying for LTE-Advanced, 3rd Generation Partnership Project (3GPP), Mobile Competence Centre ; 650, Route Des Lucioles ; F-06921 Sophia-Antipolis Cedex ; France, no. Ljubljana; Jan. 8, 2009, XP050318011, [retrieved on Jan. 8, 2009].
CMCC, "Text Proposal for TR36.814 on Relay", 3GPP TSG-RAN WG1 Meeting #56 R1-090986, 3GPP, Feb. 9, 2009, 3 Pages.
QUALCOMM Europe: "Support of Rel-8 UEs by LTE-A Relays", 3GPP RAN WG1#54bis, R1-084054, Oct. 3, 2008.

* cited by examiner

ENABLING SUPPORT FOR TRANSPARENT RELAYS IN WIRELESS COMMUNICATION

CLAIM OF PRIORITY UNDER 35 U.S.C §119

The present application for patent claims priority to Provisional Patent Application Ser. No. 61/171,374 entitled "METHODS AND APPARATUS TO ENABLE SUPPORT FOR TRANSPARENT RELAYS" and filed Apr. 21, 2009, assigned to the assignee hereof and hereby expressly incorporated by reference herein.

BACKGROUND

I. Field

The following description relates generally to wireless communications, and more particularly to facilitating arbitration of quality of service association for wireless streams employing user deployed, broadband-based wireless access points.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

One recent technological advancement in wireless communication is the integration of small, low power base stations or wireless access points within existing macro base station deployments. These low power base stations can be governed by a nearby macro base station, or can be treated as independent base stations by a wireless network. Typically, low power base stations can be deployed indoors, such as within a shopping mall, office building, apartment complex, etc., to provide targeted cellular coverage to a given building, or dispersed outdoors within poor coverage areas, to provide targeted cellular coverage for a particular geographic region. These base stations have multiple advantages for supplementing a macro deployment. First, small low power base stations are generally less expensive than full macro base stations, and can supplement a macro deployment at lower cost. Second, because these base stations typically transmit at much lower power and over shorter ranges, a supplemental deployment of low power base stations can be tailored to limit interference to the surrounding network.

Various types of supplemental or low power base stations exist. One common example is a relay node. A relay node refers to a base station-like entity that is not coupled to a wired backhaul. Further, the relay node is generally a low power base station with small coverage area relative a typical 50 watt or similar macro base station. In addition, the relay node is typically subservient to and controlled by one or more donor base stations.

In operation, a relay node receives data over-the-air from a donor base station, and can forward that data to an access terminal (AT) served by the relay node (and by the donor base station). The relay node can forward the data to the AT utilizing the same wireless spectrum as the donor base station (an in-band relay), or can receive the data on a first spectrum and retransmit that data on a second spectrum (an out-of-band relay). The in-band relay is often a half duplex entity, that can either transmit or receive in a given time frame, but not both, whereas the out-of-band relay can often be full duplex, capable of simultaneous reception and transmission (on different frequency bands).

In addition to the general characteristics described above, several variations of relay nodes exist. For instance, a transparent relay node refers to a relay node that is not visible to, or is not recognized as a separate entity by, the AT. Rather, the transparent relay is indistinguishable from the donor base station, at least from the perspective of the AT. Transparent relays, therefore, typically just repeat cell identity information, acquisition and synchronization information, and so on, as the donor base station. The most common functions of the transparent relay is to boost transmit power of signals transmitted to the AT. In some cases, the transparent relay can decode, filter, and then retransmit those signals, to provide a higher quality signal, as opposed to just providing an increase in signal amplitude. One particular relay, called an incremental redundancy relay (an IR relay), can monitor base station scheduling messages over-the-air, and identify data or control traffic intended for the AT. The IR relay demodulates this traffic, and can assist the AT in uplink or downlink feedback related signaling, such as hybrid automatic repeat request (HARQ) transmissions in a 3GPP long term evolution system. Once decoded, the IR relay can optionally filter the demodulated signal, and then re-modulate and retransmit the traffic to the AT.

Although relay nodes have several advantages, some drawbacks and design challenges do exist concerning integrating these entities into a macro deployment. For instance, half duplex nodes have fewer transmit and receive resources, due to the nature of half duplex operation. This tends to reduce efficacy of the relay node and can lower potential loading capabilities (e.g., how many ATs can be served concurrently). In addition, complexities arise in managing control signaling between the base station and relay node, or between the base station and ATs, since ATs are generally configured to look for certain control signals in particular time subframes, some of which may not be available as transmission subframes to a half duplex relay node. These and other challenges are the focus of current research in wireless networking.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides for improved implementation of supplemental wireless nodes in a wireless base station deployment. In some aspects, a donor base station is configured to send a schedule of data transmission to and from a set of user equipments (a set of UEs) served by the base station. The base station can further provide the schedule and identifiers for the set of UEs to one or more wireless nodes serving the base station. Respective access channel measurements between respective UEs and respective wireless nodes can be forwarded to the base station, which in turn can identify optimal access channels, and assign wireless nodes to serve subsets of the set of UEs accordingly.

In other aspects of the subject disclosure, the donor base station schedules a set of multiple data transmissions for the set of UEs to a common block of wireless resources, within a single signal time slot (e.g., frame, subframe, subslot, etc.). In particular aspects, an orthogonal coding scheme can be employed so that respective data transmissions of the set of multiple data transmissions are distinguishable from other transmissions of the set. Further, the donor base station assigns subsets of the wireless nodes to one or more of the data transmissions of the set, to achieve a cell-splitting gain on at least some of the data transmissions. In at least one aspect, the donor base station can mitigate or blank its own transmissions on the common block of wireless resources, to improve range of the wireless nodes. Other aspects disclose various mechanisms for obtaining uplink control reports, implemented by the base station, or by wireless terminals configured to provide such reports when coupled with a half duplex wireless node.

In other disclosed aspects is a method of wireless communication. The method can comprise obtaining a set of user equipment identifiers (a set of UE IDs) for a set of UEs served by a base station. Furthermore, the method can comprise utilizing the set of UE IDs and uplink scheduling information (UL scheduling information) for the set of UEs to obtain respective UE channel measurements. In addition, the method can comprise receiving an assignment to provide wireless service to a subset of the set of UEs based at least in part on one or more of the UE channel measurements.

In still other aspects, provided is an apparatus configured for wireless communication. The apparatus can comprise a wireless communication interface configured for exchanging wireless signals with a UE and with a set of access points associated with and located remotely from the apparatus. Moreover, the apparatus can comprise memory for storing instructions configured to provide selective access point service for the UE based on relative signal measurements of the set of access points and a data processor for executing modules to implement the instructions. Particularly, the modules can comprise a distribution module that shares an identifier (an ID) and a transmission schedule for the UE with the set of access points, and a mediation module that selects at least one of the set of access points to serve the UE based on respective UE signal measurements provided by a subset of the set of access points.

Further to the above, the subject disclosure provides an apparatus for wireless communication. The apparatus can comprise means for employing a communication interface to obtain a set of UE IDs for a set of UEs served by a base station. Additionally, the apparatus can comprise means for employing a signal processor that utilizes the set of UE IDs and UL scheduling information for the set of UEs to obtain respective UE channel measurements. In at least some aspects, the apparatus can also comprise means for employing the communication interface for receiving an assignment to provide wireless service to a subset of the set of UEs based at least in part on one or more of the UE channel measurements.

According to one or more further aspects, disclosed is at least one processor configured for wireless communication. The processor(s) can comprise a module that obtains a set of UE IDs for a set of UEs served by a base station. The processor(s) can moreover comprise a module that utilizes the set of UE IDs and UL scheduling information for the set of UEs to obtain respective UE channel measurements. Additionally, the processor(s) can also comprise a module that receives an assignment to provide wireless service to a subset of the set of UEs based at least in part on one or more of the UE channel measurements.

In at least one additional aspect, disclosed is a computer program product, comprising a computer-readable medium. The computer-readable medium can comprise code that causes a computer to obtain a set of UE IDs for a set of UEs served by a base station. The computer-readable medium can further comprise code that causes the computer to utilize the set of UE IDs and UL scheduling information for the set of UEs to obtain respective UE channel measurements. In addition to the foregoing, the computer-readable medium can comprise code that causes the computer to receive an assignment to provide wireless service to a subset of the set of UEs based at least in part on one or more of the UE channel measurements.

According to still other aspects of the subject disclosure, provided is a method of wireless communication. The method can comprise sending a wireless signal comprising a resource assignment directly to a set of UEs, wherein the resource assignment schedules a transmission for each of the set of UEs on a common wireless resource. Additionally, the method can comprise routing data transmissions to or from the set of UEs via one or more wireless nodes to achieve a cell-splitting gain at least on the common wireless resource for the data transmissions.

In another disclosed aspect, provided is an apparatus configured for wireless communication. The apparatus can comprise a communication interface configured for exchanging wireless signals with a base station and with a set of UEs. Moreover, the apparatus can comprise a memory for storing instructions configured to provide remote node-assisted wireless service for one or more of the set of UEs, and a data processor for executing modules that implement the instructions. Specifically, the modules can comprise a scheduling module that generates a resource schedule for the set of UEs that allocates a single set of wireless resources provided by multiple wireless nodes associated with the apparatus to a plurality of data streams involving the set of UEs. In at least one aspect, the modules can further comprise a distribution module that employs the communication interface to send the resource schedule to respective ones of the multiple wireless nodes participating in the plurality of data streams.

According to a particular aspect, provided is an apparatus configured for wireless communication. The apparatus can comprise means for employing a wireless transceiver to transmit a resource assignment directly to a set of UEs, wherein the resource assignment schedules a transmission for each of the set of UEs on a common wireless resource. Moreover, the apparatus can comprise means for employing the wireless transceiver to route respective data transmissions of the set of UEs via one or more wireless nodes to achieve a cell-splitting gain for at least one of the data transmissions at least on the common wireless resource.

In another aspect, disclosed is at least one processor configured for wireless communication. The processor(s) can comprise a module that transmits a resource assignment directly to a set of UEs, wherein the resource assignment schedules a transmission for each of the set of UEs on a common wireless resource. Additionally, the processor(s) can comprise a module that routes respective data transmissions of the set of UEs via one or more wireless nodes to achieve a cell-splitting gain for at least one of the data transmissions at least on the common wireless resource.

In yet another aspect, provided is a computer program product comprising a computer-readable medium. The computer-readable medium can comprise code for causing a computer to transmit a resource assignment directly to a set of user equipments (a set of UEs), wherein the resource assignment schedules a transmission for each of the set of UEs on a common wireless resource. Furthermore, the computer-readable medium can comprise code for causing the computer to route respective data transmissions of the set of UEs via one or more wireless nodes to achieve a cell-splitting gain for at least one of the data transmissions at least on the common wireless resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
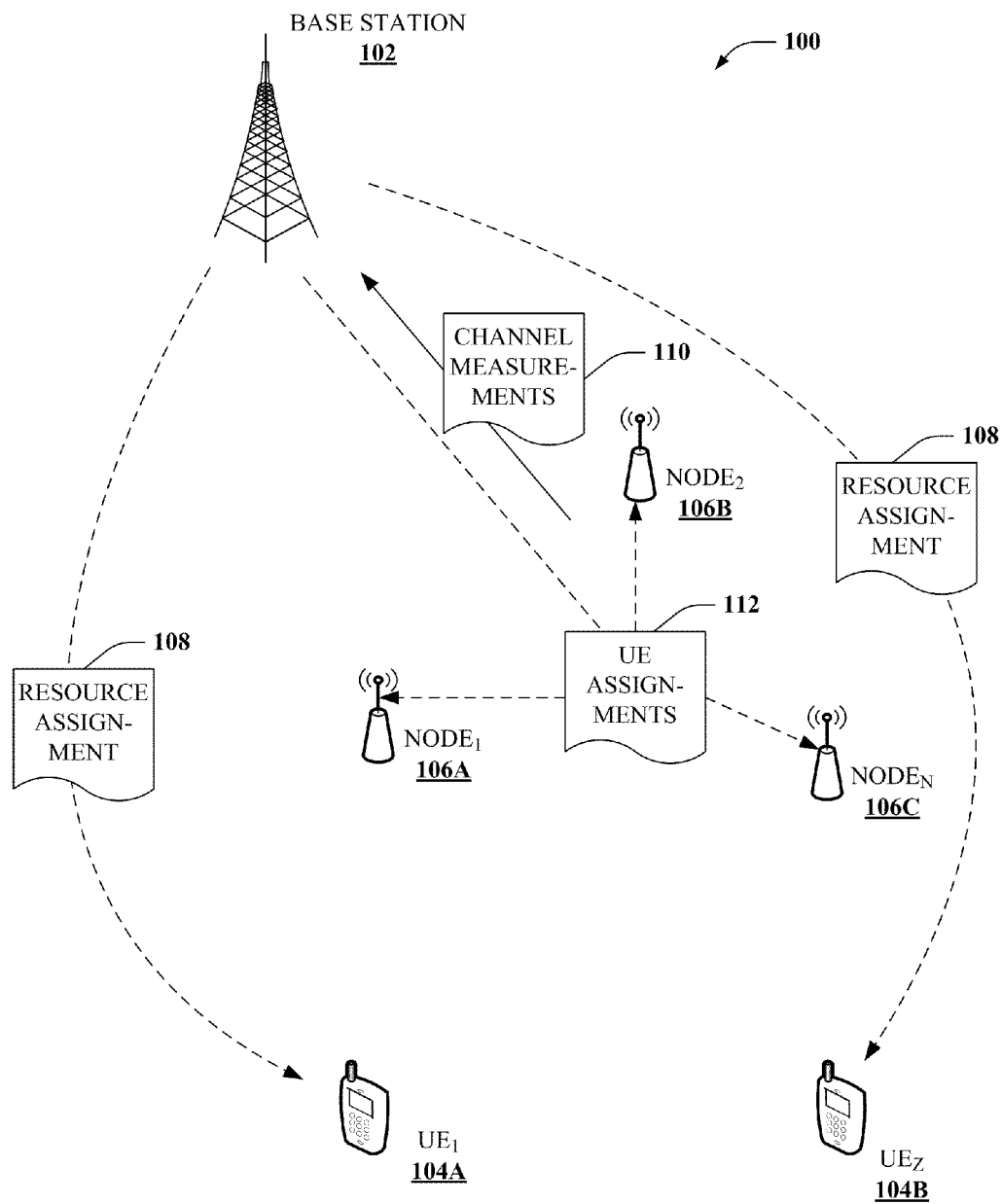
FIG. 1 illustrates a block diagram of an example system for real-time node assignment of a population of user equipments (UEs) for wireless communication.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of managing access channels provided by transparent relay nodes to achieve channel differentiation, cell-splitting and range boosting, in a wireless communication network, among other things. One skilled in the art should appreciate that similar techniques could apply to other communication environments.

Wireless communication systems achieve electronic communication between remotely located wireless nodes through local infrastructure deployments and central networks that communicatively couple local infrastructure (e.g., a base station). In general, the local infrastructure can utilize various principles to exchange wireless information with these nodes. In some cases, the infrastructure may employ a set of remote wireless nodes under control of a donor base station, to supplement wireless access coverage in a particular geographic area (e.g., a cell) served by the donor base station. This arrangement can provide multiple benefits. First, the remote wireless nodes can provide cost effective supplemental radio services in portions of the geographic area receiving poor coverage from the donor base station. Second, the additional antennas of the wireless nodes can theoretically be utilized to achieve multi-antenna gains, similar to a MIMO antenna arrangement, or coordinated multipoint (CoMP) arrangement. The latter is dependent on discovery of ways to identify and manage different access channels provided by the wireless nodes, however. Other benefits can include reduction of signal to noise ratio (SNR), improved performance at a cell boundary, reduced inter-cell or intra-cell interference, and so on.

Transparent relays raise several issues in implementation. For instance, full duplex wireless nodes can be cost ineffective, providing at least some preference for half duplex wireless nodes to be used instead. However, half duplex nodes cannot transmit and receive signals on a single band concurrently. For a single carrier environment, therefore, the half duplex node has fewer resources to allocate to transmission and reception in a single subframe, or other transmission time slot (where, e.g., the term transmission time slot can refer to an orthogonal frequency division multiplex [OFDM] symbol in an OFDM wireless network, or a signal sub slot, a signal subframe, a group of subframes/subslots such as an interlace, a group of OFDM symbols, or some other suitable time-based division of a wireless signal or aggregations thereof). For many wireless environments (e.g., third generation partnership project long term evolution [3GPP LTE], or just LTE), the relay node does not re-transmit or repeat reference signals, pilot signals or acquisition/synchronization signals, etc., of a donor base station (e.g., a donor eNB) in all transmission time slots that the donor base station transmits these signals. This can significantly disrupt channel measurements of UEs. Particularly, if one subset of time slots has just the donor eNB's signal, while another subset of time slots has both the repeated signal and the eNB's signal, time-averaging commonly used for channel measurements can be destroyed.

Further to the above, transparent relay nodes do not have independent transmissions which a UE can distinguish from a donor eNB. As a result, measurement reports or channel quality indicator (CQI) reports do not identify a particular wireless node providing the channel, and the specific channel conditions associated with that wireless node. Accordingly, it is difficult for a network to identify a preferred channel and wireless node for different UEs. Moreover, it is also difficult for the network to carry out accurate rate predictions when a wireless node assists eNB transmissions. As is described in more detail below, various aspects of the subject disclosure address these and other problems in wireless communication.

FIG. 1 illustrates a block diagram of an example wireless communication environment 100 according to aspects of the subject disclosure. Wireless communication environment 100 comprises a base station 102 serving a geographic cell (or a cell) associated with base station 102. Base station 102 can be of various types of radio access network infrastructure, depending on a type of network that base station 102 is coupled with. For instance, in a universal mobile telecommunications system (UMTS) network, base station 102 can comprise a NodeB, whereas in a global system for mobile communication (GSM) network, base station 102 can comprise a base transceiver station (BTS). It should be appreciated, however, that base station 102 is not limited to the foregoing examples; rather, legacy base stations of legacy networks (e.g., release 99), and advanced base stations (e.g., enhanced Node B, or eNB) of more modern networks (e.g., LTE) are included within the scope of the subject disclosure.

Further to the above, base station 102 serves a set of UEs, $UE_1$ 104A through $UE_Z$ 104B, where Z is an integer greater than zero (referred to collectively as UEs 104A-104B), and also base station 102 controls a set of wireless nodes, including $node_1$ 106A, $node_2$ 106B through $node_N$ 106C, where N is an integer greater than one (referred to collectively as wireless nodes 106A-106C). Wireless nodes 106A-106C can include transparent relay nodes, in at least one aspect of the subject disclosure. However, the disclosure is not so limited, and one or more of wireless nodes 106A-106C can be a transparent repeater, a transparent wireless relay, a transparent pico cell, a remote radio head, a smart repeater, an incremental redundancy relay, or the like, or a suitable combination thereof.

In operation, base station 102 can schedule data transmissions for UEs 104A-104B to be routed via one or more of wireless nodes 106A-106C. Such a schedule may be selected by base station 102 if one or more of UEs 104A-104B handover to a wireless node 106A-106C, or report preferable SNR on one or more of wireless nodes 106A-106C (e.g., where a node is not a transparent node), or the like. Downlink (DL) control signaling from base station 102 can be sent directly over-the-air (OTA) to UEs 104A-104B, or can be routed on a DL transmission via one or more of wireless nodes 106A-106C. In at least one aspect of the subject disclosure, base station 102 transmits a resource assignment 108 to $UE_1$ 104A and $UE_Z$ 104B. Resource assignment 108 specifies a different set of wireless resources on one or more access channels, data channels, etc., provided by wireless nodes 106A-106C, for each of the respective data transmissions. Additionally, base station 102 sends resource assignment 108 to wireless nodes 106A-106C, to enable the nodes to utilize the different set of wireless resources for identifying respective transmissions of the UEs 104A-104B.

Initial DL and uplink (UL) data transmissions can be routed through a default one of the wireless nodes, or via each of the wireless nodes to and from UEs 104A-104B. In addition, individual channel measurements are performed for the respective data transmissions, in order to obtain channel measurements 110 for respective access channels between respective wireless nodes 106A-106C, and respective UEs 104A-104B (e.g., see FIG. 2, infra). In one aspect of the subject disclosure, wireless nodes 106A-106C analyze UL transmissions of the respective data transmissions to obtain the channel measurements 110. In another aspect, UEs 104A-104B analyze DL transmissions of the respective data transmission (sent by one or more of wireless nodes 106A-106C) to obtain channel measurements 110. In still another aspect, a combination of UL transmissions and DL transmissions can be included in channel measurements 110.

Upon receiving channel measurements 110, base station 102 extracts data pertaining to individual access channels that communicatively couple UEs 104A-104B and wireless nodes 106A-106C. As a result, base station 102 can identify preferred characteristics of one or more of the access channels. For instance, a wireless channel coupling $node_2$ 106B with $UE_1$ 104A might be associated with a better signal characteristic than a wireless channel coupling $node_N$ 106C with $UE_1$ 104A, or $node_1$ 106A with $UE_1$ 104A, and so forth. Based on this information, base station 102 could assign $node_2$ 106B to serve $UE_1$ 104A, for instance. This analysis of wireless channels from channel measurements 110 can be conducted for each wireless channel involved in the data transmissions between wireless nodes 106A-106C and UEs 104A-104B. Based on the analysis, therefore, base station 102 can assign a subset of wireless nodes 106A-106C to one or more of UEs 104A-104B (or base station 102 can select to exchange control and data traffic with a UE directly, where no wireless channel is superior to a channel coupling base station 102 to such UE).

It should be appreciated that base station 102 is not limited to analyzing the respective wireless channels via a single characteristic or signal metric. Rather, the characteristic can comprise one or more signal metrics, and where multiple signal metrics are utilized, each metric can be weighted with respect to other metrics with a weighting formula, or other suitable function assigning relative importance to different metrics in determining the signal characteristic. In some aspects, base station 102 can employ a plurality of signal characteristics for selecting a preferred wireless channel to serve one or more of UEs 104A-104B. As a specific example, the characteristic(s) can comprise signal strength, SNR, rise over thermal, path loss, relative signal interference, achievable bandwidth, or achievable data rate, or another suitable metric of signal strength or quality, or a suitable combination thereof, at a suitable relative weighting.

Figure 2:
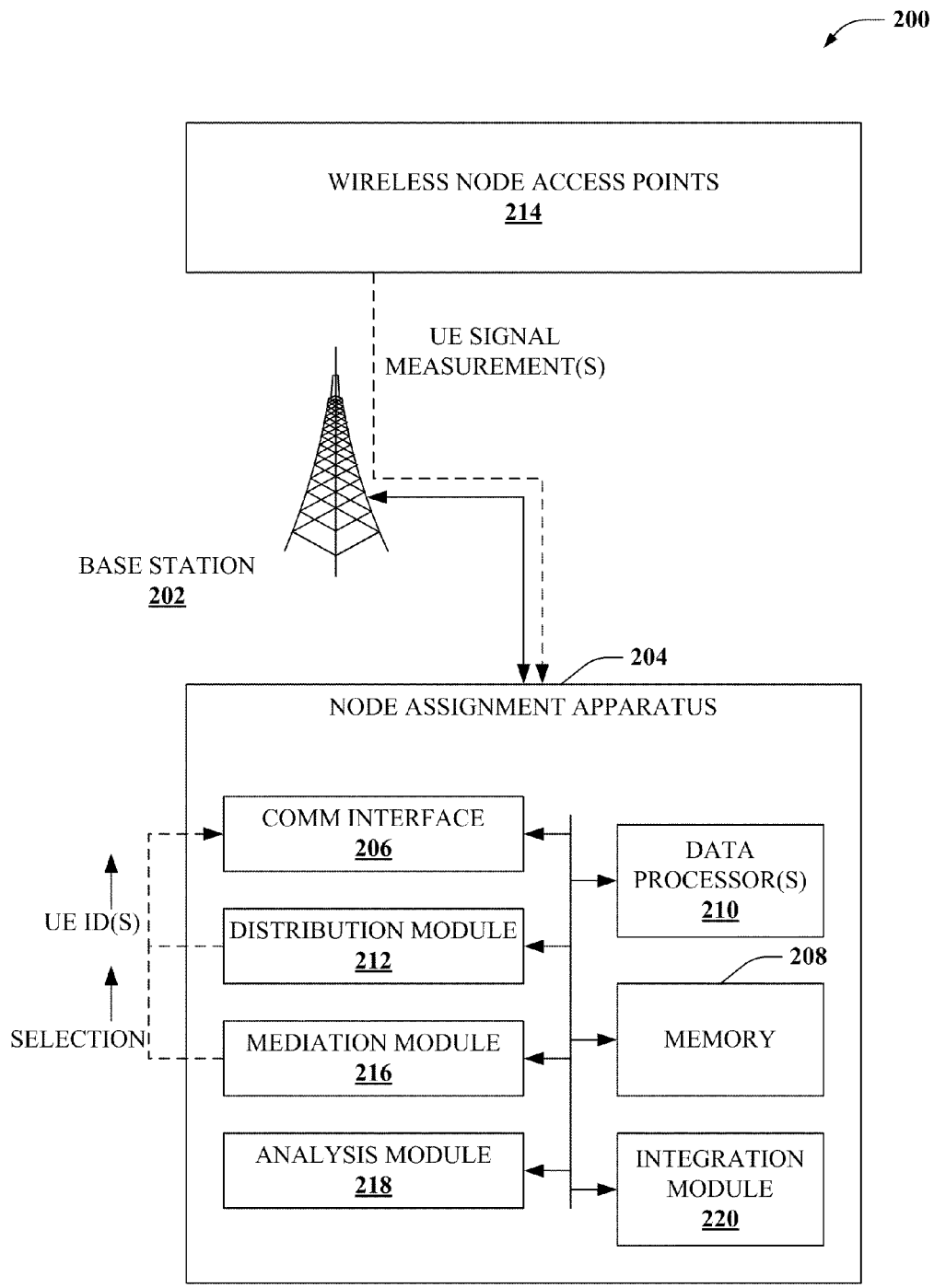
FIG. 2 depicts a block diagram of an example apparatus that provides multi-node management for wireless relay nodes according to disclosed aspects.

FIG. 2 illustrates a block diagram of an example wireless system 200 for providing improved wireless communications. As an example, wireless system 200 can provide preferential channel selection for access channels involving a set of wireless nodes. In at least one aspect, one or more of the wireless nodes can comprise a transparent node, although the subject disclosure is not limited to this aspect(s).

Wireless system 200 can comprise a base station 202 coupled with a node assignment apparatus 204. In addition, base station 202 is communicatively coupled with a set of wireless node access points 214 that provides supplemental wireless coverage within a geographic area served by base station 202. In one aspect, base station 202 could be coupled with one or more of wireless node access points 214 by a wired backhaul, but more commonly, base station 202 is coupled with wireless node access points 214 by a wireless backhaul. The wireless backhaul can comprise a subset of transmission time slots of a single carrier employed by base station 202 (e.g., where wireless node access points 214 employ half duplex communication), or can comprise all (or some other subset) of transmission time slots of a second carrier employed by base station 202 that is dedicated to backhaul communication between base station 202 and wireless node access points 214.

Similar to wireless nodes 106A-106C of FIG. 1, supra, wireless node access points 214 can comprise wireless relays, transparent relays, wireless repeaters, smart repeaters, and so on. In general, wireless node access points 214 are configured to provide a set of access channels at least for data traffic communication for one or more UEs (not depicted) served by base station 202. In one aspect, these access channels are limited to DL and UL data traffic. However, in other aspects, the access channels can carry both data traffic and control traffic, either UL or DL, or a combination thereof.

Node assignment apparatus 204 can comprise a wireless communication interface 206 configured for exchanging wireless signals with a UE and with a set of access points associated with and located remotely from base station 202 (e.g., wireless node access points 214). In one aspect, wireless communication interface 206 comprises a transmit-receive chain (not depicted, but see FIG. 12, infra, as one example) of base station 202. In other aspects, however, wireless communication interface 206 can be a hardware or software module that communicates electronically with base station 202 (or with the transmit-receive chain thereof) to effect the exchanging wireless signals with the UE and with the set of access points.

Further to the above, node assignment apparatus 204 can comprise memory 208 for storing instructions configured to provide selective access point service for the UE based on relative access channel measurements. Additionally, node assignment apparatus 204 can comprise a data processor for executing modules to implement the instructions. Particularly, the modules can comprise a distribution module 212 that shares an identifier (an ID) and a transmission schedule for the UE with the set of wireless node access points 214 (e.g., by employing wireless communication interface 206 and base station 202 to transmit the IE and transmission schedule thereto). The UE ID and transmission schedule can assist the wireless node access points 214 in identifying signals transmitted by the UE, and access channel resources on which to expect those signals, respectively. Furthermore, node assignment apparatus 204 can comprise a mediation module 216 that selects at least one of the set of wireless node access points 214 to serve the UE based on respective UE signal measurements provided by a subset of the wireless node access points 214.

It should be appreciated that in at least some disclosed aspects, node assignment apparatus 204 can be configured to alleviate problems distinguishing access channels provided by transparent relays. Typically, a UE reports DL channel measurements to a base station in order to give the base station an indication of channel strength, quality, etc., as observed by the UE. However, because the UE cannot distinguish transparent relays from the base station or from each other, the UE cannot provide distinct channel measurements for distinct relay access channels. However, by sharing the UE ID and transmission schedule among wireless node access points 214, the respective access points can, at a minimum, each take measurements of UL transmissions sent by the UE. These UE signal measurements can be forwarded to base station 202 to differentiate the respective access channels, enabling base station 202 to select a preferred one of the wireless node access points 214 to serve 214.

Based at least in part on the foregoing, in one or more aspects of the subject disclosure, node assignment apparatus 204 can further comprise an analysis module 218 that identifies whether a characteristic of the UE signal measurements varies among the respective UE signal measurements sent by respective ones of wireless node access points 214. In one particular example, the characteristic comprises a signal strength characteristic, signal quality characteristic or a signal noise characteristic of the UE signal measurements. As a more particular example, the characteristic comprises signal strength, signal to noise ratio, rise over thermal, path loss, relative signal interference, achievable bandwidth, or achievable data rate, or a combination thereof. It should be appreciated that suitable weights of the foregoing characteristics can be employed, where the characteristic comprises multiple ones of the foregoing or like examples.

In one exemplary implementation, mediation module 216 selects one access point of the set of wireless node access points 214 to serve the UE based on a value of the characteristic for a UE signal measurement provided by the one access point. In this case, mediation module 216 could be configured as a module that employs a selection policy stored in the memory 208 for analyzing the value of the characteristic relative to respective values of the characteristic pertaining to respective UE signal measurements provided by other access points of the subset of the set of access points. Particularly, the selection policy can be a policy that defines a preferred ranking of values of the characteristic, or a target value of the characteristic. In this case, mediation module 216 selects the one access point because the value of the characteristic is closest to the target value (as compared with values of the characteristic for UE signal measurements associated with other ones of wireless node access points 214) or because the value of the characteristic is superior to the respective values of the characteristic based on the preferred ranking. In at least one aspect of the subject disclosure, mediation module 216 selects a plurality of the set of wireless node access points 214 to serve the UE based on respective values of the characteristic associated with respective UE signal measurements of the plurality of the set of access points. This can occur, for instance, where the selection policy allows for multiples ones of the wireless node access points 214 to serve the UE, so long as the respective values of the characteristic are above a threshold characteristic value for multi-node service, or the like.

According to still other aspects of the subject disclosure, node assignment apparatus 204 can comprise an integration module 220. Integration module 220 can be configured as a module that generates a redundancy policy that assigns respective traffic, channels or data streams associated with the UE to respective access points of a plurality of wireless node access points 214. Particularly, integration module 220 can be activated to generate the redundancy policy when mediation module 216 selects a plurality of access points to serve the UE. This redundancy policy can be employed to facilitate an incremental redundancy service for the UE, where different types of traffic (e.g., voice traffic, data traffic), are handled by different access points, different channels (e.g., a control channel, a data channel) are handled by different access points, different data streams (e.g., an application data stream, a voice over Internet Protocol [VoIP] data stream, or the like) are handled by different access points, or some other suitable division of the respective traffic, channels or data streams and the plurality of access points is provided. In a particular aspect, the redundancy policy includes an assignment of the respective traffic, channels or data streams to respective ones of the plurality of the set of access points based on one or more characteristics of respective UE signal measurements provided by the plurality of the set of access points that are pertinent to the respective traffic, channels or data streams. In this case, the selection policy employed by mediation module 216 can further specify different characteristics (or combinations thereof) suitable to different channel types, traffic types, or data stream types, and selection of respective access points for respective traffic, channels or data streams can be implemented by mediation module 216 and included in the redundancy policy. Thus, where an access channel is preferred for voice traffic, an access point providing that access channel can be assigned to a UE engaged in voice traffic, and so on.

Figure 3:
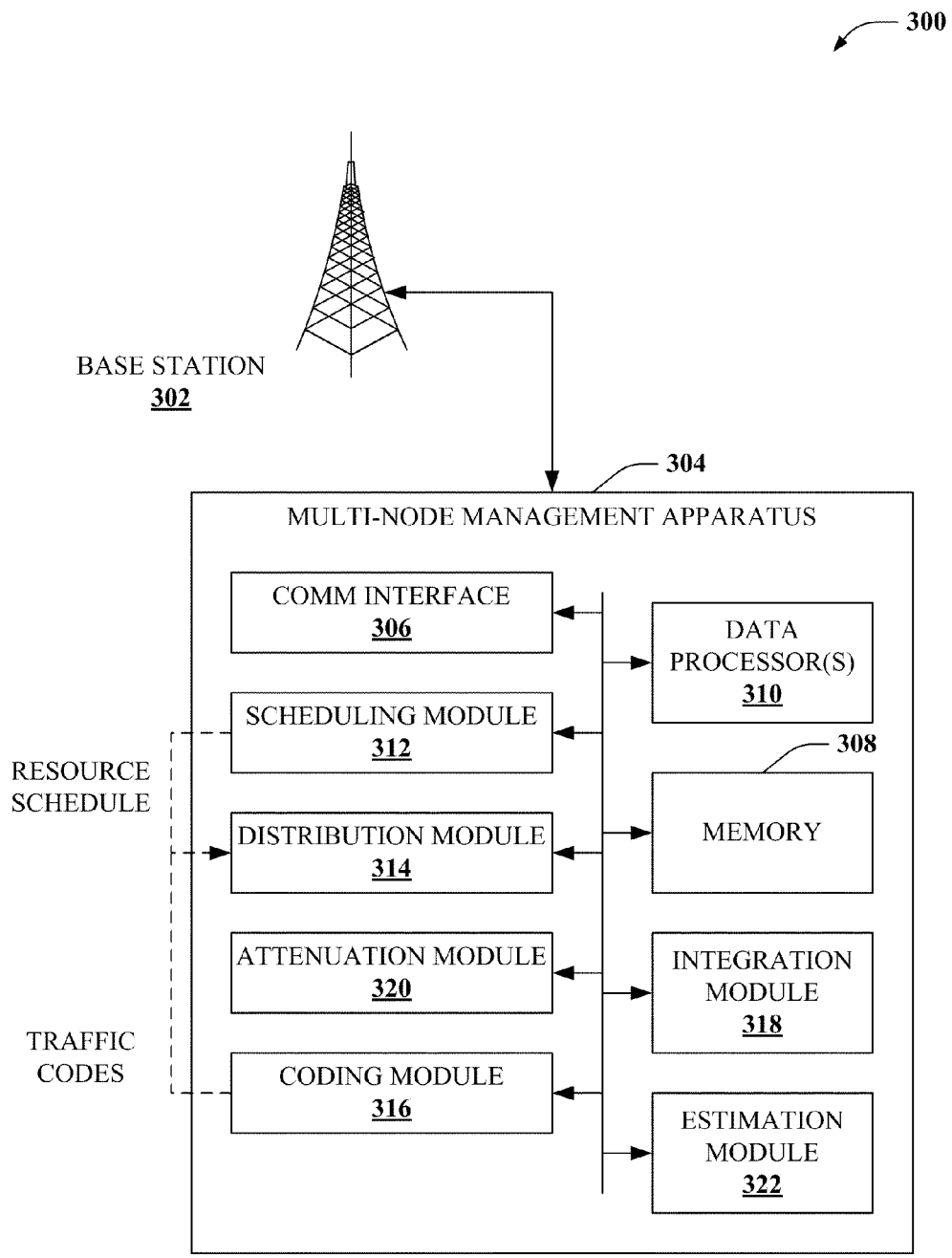
FIG. 3 depicts a block diagram of a sample apparatus that provides cell-splitting utilizing multiple access channels provides by a set of wireless nodes.

FIG. 3 illustrates a block diagram of a sample wireless access system 300 according to one or more other aspects of the subject disclosure. Particularly, wireless access system 300 comprises a base station 302 communicatively coupled with a multi-node management apparatus 304. Multi-mode management apparatus 304 can be configured to provide cell-splitting gains for a set of UEs (not depicted) served by wireless nodes (not depicted, but see FIG. 4, infra) associated with base station 302, as is described in more detail below. Similar to other wireless nodes described herein, one or more of the wireless nodes associated with base station 302 can comprise a transparent repeater, a transparent wireless relay, a transparent pico cell, a remote radio head, a smart repeater, an incremental redundancy relay, or another suitable wireless node, or a suitable combination thereof.

Multi-node management apparatus 304 can comprise a communication interface 306 configured for exchanging wireless signals with base station 302 and with a set of UEs (e.g., by employing a wireless transmit-receive chain of base station 302). Additionally, multi-node management apparatus 304 can comprise a memory 308 for storing instructions configured to provide remote node-assisted wireless service for one or more of the set of UEs, and a data processor 310 for executing modules that implement the instructions. Particularly, the modules can comprise a scheduling module 312 that generates a resource schedule for the set of UEs. The resource schedule includes an assignment that allocates a single set of wireless resources (e.g., a common frequency band during a single transmission time slot or set of transmission time slots), provided by multiple wireless nodes associated with base station 302, to a plurality of data streams involving the set of UEs. In addition, multi-node management apparatus 304 can comprise a distribution module 314 that employs communication interface 306 to send the resource schedule to respective ones of the multiple wireless nodes participating in the plurality of data streams. Accordingly, the respective wireless nodes can identify UEs or particular data streams for wireless service, as specified by the resource schedule. By assigning multiple wireless nodes to these data streams, cell-splitting and related wireless benefits can be achieved, e.g., through improved SNR between respective wireless nodes and respective UEs, and in some cases improved throughput or data rates with multi-antenna arrangements (e.g., where subsets of the multiple wireless nodes serve at least one of the UEs).

In some aspects of the subject disclosure, scheduling module 312 assigns respective ones of the plurality of data streams to respective ones of the multiple wireless nodes. This can be done in a manner that maximizes SNR for the data streams, for instance. In other aspects, scheduling module 312 assigns respective ones of the plurality of data streams to respective subsets of the multiple wireless nodes that each comprises one or more of the multiple wireless nodes. In these latter aspects, multi-node management apparatus 304 can employ an integration module that establishes an incremental redundancy policy for one of the subsets of the multiple wireless nodes that comprises a plurality of the multiple wireless nodes. This incremental redundancy policy can further be a policy that includes an assignment of portions of a data stream to respective wireless nodes of the one of the subsets of the multiple wireless nodes. The policy can assign respective wireless nodes having channel characteristics most suited to respective portions of the data stream, in one instance, or can also assign multiple wireless nodes to one or more of the portions, to achieve multi-antenna gains for at least those portion(s).

According to still other aspects of the subject disclosure, multi-node management apparatus 304 can comprise a coding module 316 that facilitates orthogonal codes for one or more of the plurality of data streams to differentiate transmissions between the multiple wireless nodes and the set of UEs. Because the data streams are transmitted in a single transmission time slot or set of transmission time slots, the orthogonal codes can be integrated into DL or UL transmissions between the wireless nodes and the UEs to aid in receiving those transmissions. Additionally, coding module 316 can generate different codes for different UEs, different relays, or different groups of UEs (e.g., engaged in CoMP UL transmission). The codes can be utilized for scrambling on pilot transmissions, on data transmissions, or a combination thereof. In one aspect, the orthogonal codes are generated by coding module 316 and explicitly sent via physical layer or layer two signaling to respective wireless nodes or UEs. In another aspect, coding seeds can be sent out by coding module 316 instead, which can be used to respective wireless nodes or respective UEs to generate the respective orthogonal codes. In an alternative aspect, the orthogonal codes can be sent by layer three signaling instead.

According to further aspects, multi-node assignment apparatus 304 can comprise an attenuation module 320 that reduces power of transmissions of base station 302 (and multi-node assignment apparatus 304 via base station 302) that are concurrent with the single set of wireless resources assigned for the data streams. This reduces interference for the wireless nodes on the single set of wireless resources (e.g., a particular frequency band), which can in turn increase range of the respective wireless nodes as well. This increased range, or range boosting, can be particularly useful at an edge of a cell or geographic boundary served by base station 302, where base station 302 provides poor service. However, range boosting can also be particularly useful where base station 302 provides a strong signal, by making respective wireless relay more accessible to UEs, thereby increasing load capacity of the wireless nodes, and of base station 302 overall. To implement the power reduction for base station 302, scheduling module 312 can be configured as a module that reschedules the transmissions of base station 302 that are concurrent with the single set of wireless resources. In this case, attenuation module 320 reduces transmit power of base station 302 to zero (or substantially zero) during a transmission time slot (or set of time slots) that is concurrent with transmission of the data streams on the single set of wireless resources.

When employing range boosting, obtaining CQI information can be interrupted since base station 302 is not transmitting, or is transmitting with lower power, in the transmission time slot(s) utilized for the data streams. To alleviate this problem, multi-node management apparatus 304 can utilize an estimation module 322 that employs time division duplex (TDD) channel reciprocity to estimate path loss in wireless channels established between the multiple wireless nodes and the set of UEs. Thus, the path loss can be estimated directly, rather than inferred from CQI information.

In an alternative aspect, multi-node management apparatus 304 can instead employ a CQI-specific reference signal (a CQI-RS), for instance for one or more UEs that are configured to recognize a command to transmit the CQI-RS, and perform such transmission. In this case, scheduling module 312 includes within the resource schedule a command for one (or more) of the set of UEs to transmit a low reuse node-specific channel quality indicator reference signal (a low reuse node-specific CQI-RS). Communication interface 306 receives the low reuse node-specific CQI-RS on an uplink channel from the one of the set of UEs. A measurement module 324 can then be employed by multi-node management apparatus 304 that analyzes the low reuse node-specific CQI-RS to estimate path loss for a wireless channel utilized by the one of the set of UEs.

Figure 4:
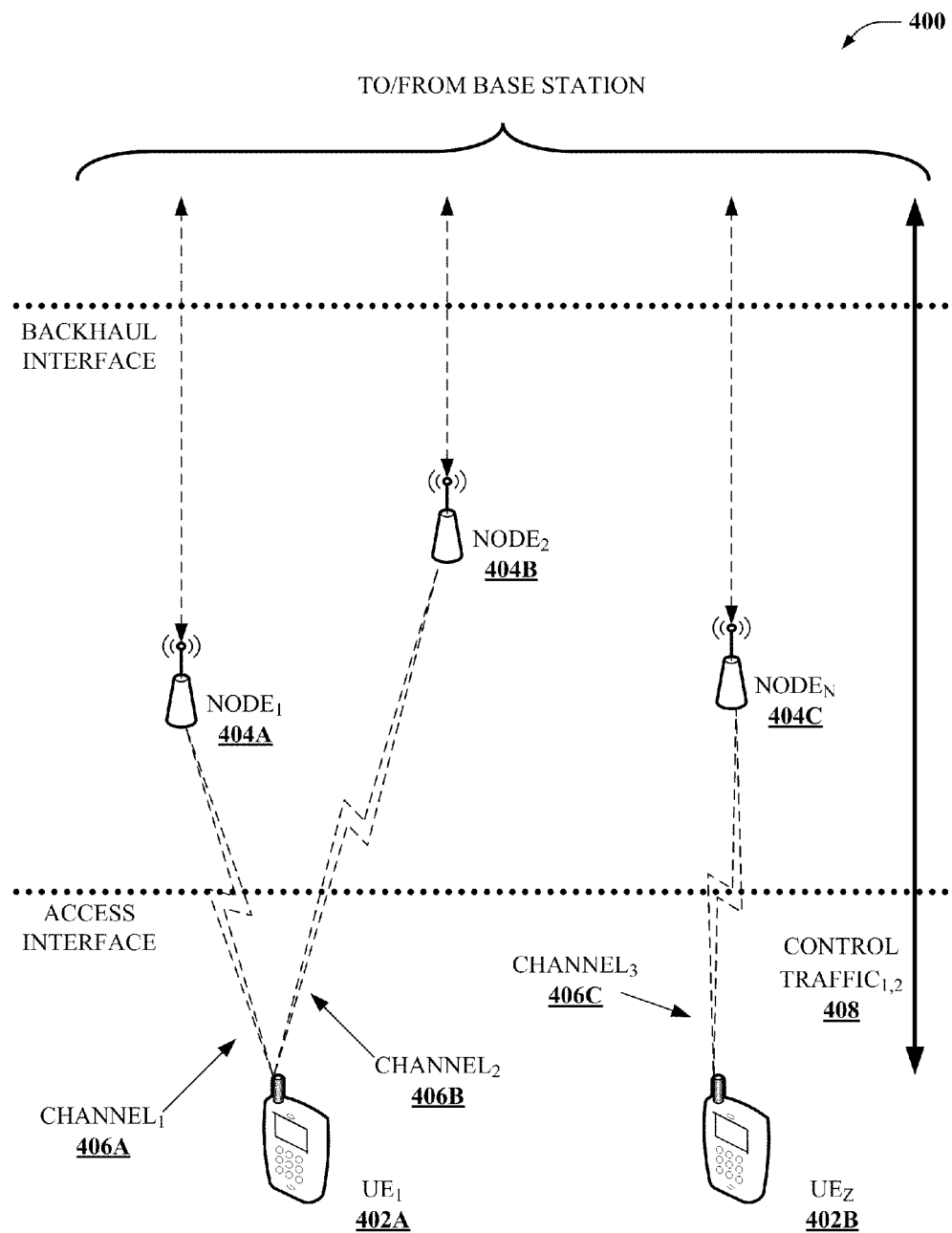
FIG. 4 illustrates a block diagram of an example wireless environment for selective cell-splitting according to particular aspects of the subject disclosure.

FIG. 4 illustrates a diagram of an example wireless access channel environment 400 according to additional aspects of the subject disclosure. Wireless access channel environment 400 comprises a set of wireless nodes, including node$_1$ 404A, node$_2$ 404B, through node$_N$ 404C (collectively referred to as wireless nodes 404A-404C). Each of wireless nodes 404A-404C is communicatively coupled with at least one UE of a set of UEs, which includes UE$_1$ 402A through UE$_Z$ 402B (collectively referred to as UEs 402A-404B).

Data information (including packet data traffic and circuit-switched traffic) or control information exchanged between wireless nodes 404A-404C and UEs 402A-402B is transmitted over an access interface, comprising separate access channels between each wireless node 404A-404C and each UE 402A-402B. As depicted, there are three different access channels, access channel$_1$ 406A communicatively coupling UE$_1$ 402A and wireless node$_1$ 404A, access channel$_2$ 406B communicatively coupling UE$_1$ 402A and wireless node$_2$ 404B, and access channel$_3$ 406C communicatively coupling UE$_Z$ 402B and wireless node$_N$ 404C (collectively referred to as control channels 406A-406C).

In one aspect, control traffic can be transmitted over a respective control channels 408 directly to UEs 402A-402B from a base station associated with wireless nodes 404A-404C. In an alternative aspect, a portion or all of the control traffic can be transmitted via wireless nodes 404A-404C and access channels 406A-406C instead. Information exchanged between wireless nodes 404A-404C and the base station is transmitted over a backhaul interface communicatively coupling wireless nodes 404A-404C with the base station. In one aspect, the backhaul interface can comprise a wired interface; in another aspect, the backhaul interface can comprise a wireless interface. According to yet another aspect, the backhaul interface can comprise a combination of a wired and wireless interfaces (e.g., where the base station exchanges information directly with one of wireless nodes 404A-404C through a wired interface, and the one wireless node 404A-404C forwards that information wirelessly to remaining wireless nodes 404A-404C).

As described herein, respective wireless nodes 404A-404C can measure UL transmissions of respective UEs 402A-402B to acquire quality or signal strength estimations of respective access channels 406A-406C. These estimations can be forwarded to the base station to identify a preferred access channel(s) 406A-406C for respective UEs 402A-402B, or for respective types of traffic, channels or data streams employed by the UEs 402A-402B, as described herein. Similarly, UEs 402A-402B can measure DL transmissions of respective wireless nodes 404A-404C to acquire quality or signal strength estimations of the respective wireless channels 406A-406C (e.g., where one or more of wireless nodes 404A-404C are not transparent nodes). These estimations can be forwarded to the base station by UEs 402A-402B, either through control channels 408, or via access channels 406A-406C, and utilized to identify preferred access channels 406A-406C as well.

In at least one aspect, multi-antenna and CoMP wireless communication can be implemented for wireless access channel environment 400. Thus, for instance, node$_1$ 404A and node$_2$ 404B can provide multi-antenna DL transmission for UE$_1$ 402A to achieve improved throughput or data rates available through such multi-antenna wireless communication. Alternatively, or in addition, one or more of UEs 402A-402B can engage in multi-antenna UL transmission, either via multiple antennas associated with the respective UEs 402A-402B, or via peer-to-peer communication among a plurality of UEs 402A-402B to achieve UE CoMP for the UL transmissions. In either of the foregoing multi-antenna cases, the base station can employ multi-node management as described herein to achieve improved SNR, cell-splitting, or increased throughput or data rates on wireless channels 406A-406C.

Figure 5:
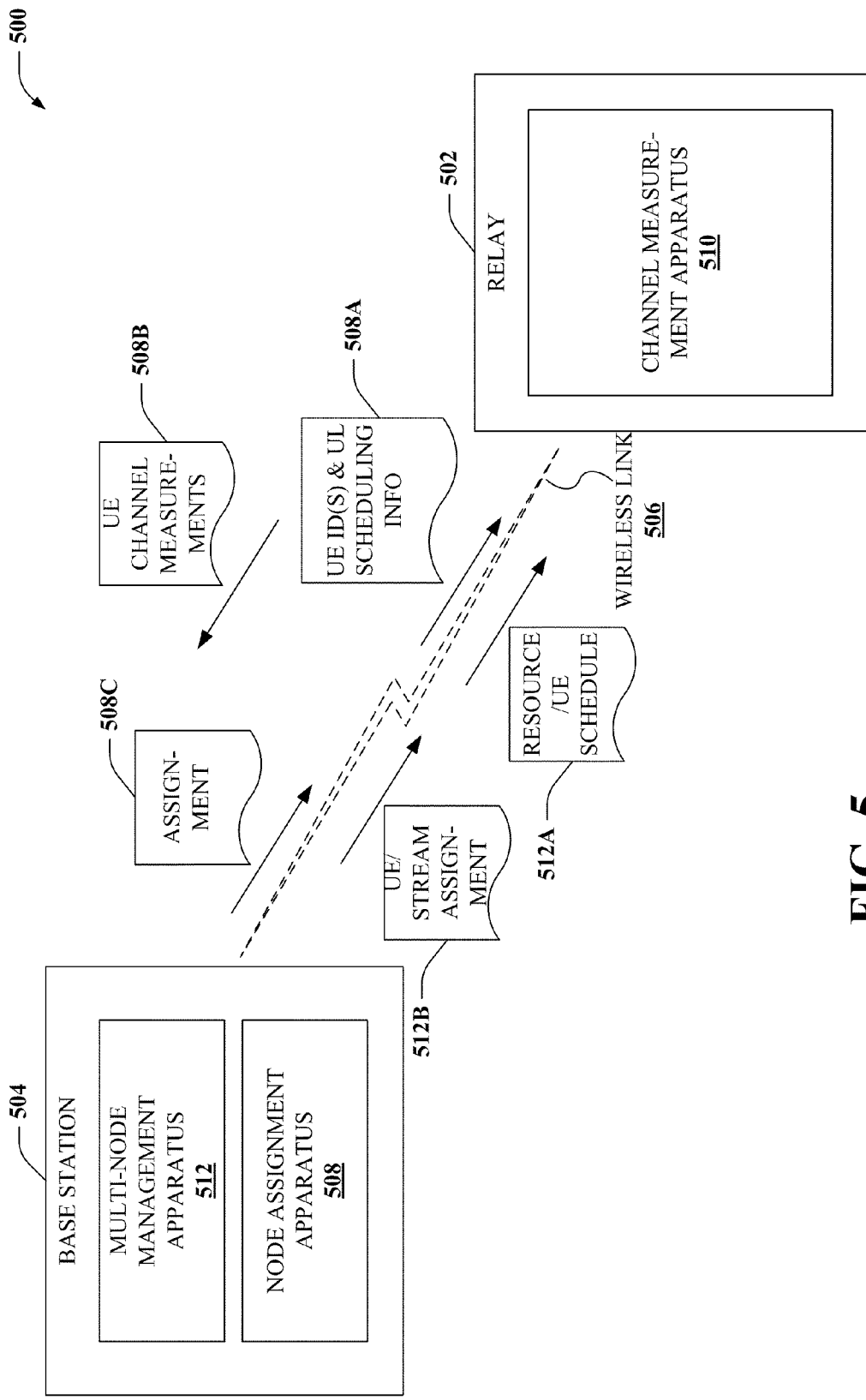
FIG. 5 depicts a block diagram of an example wireless communication apparatus according to other aspects of the subject disclosure.

FIG. 5 illustrates a block diagram of an example wireless communication arrangement 500 according to further aspects of the subject disclosure. Wireless communication arrangement 500 comprises a relay node 502 communicatively coupled with a base station 504 via a wireless link 506. Base station 504 can comprise a node assignment apparatus 508 that can be configured to identify preferred access channels (not depicted, but see FIG. 4, supra) associated with relay node 502. To accomplish this identification, node assignment apparatus 508 can send a set of UE IDs and UL or DL scheduling information 508A to relay node 502. Relay node 502 can employ the UE IDs and UL or DL scheduling information to exchange data with one or more UEs camping on relay node 502, and employ a channel measurement apparatus 510 to perform channel measurements pertaining to the data exchange. A report of UE channel measurements 508B is transmitted by channel measurement apparatus 510 to base station 504 and received at node assignment apparatus 508. Based on this report of UE channel measurements 508B, node assignment apparatus 508 can identify a preferred channel for each of the one or more UEs, and send an assignment 508C to relay node 502 indicating specific UEs to be served by relay node 502, or particular control or data traffic, data streams, or types or traffic to be served by relay node 502, as described herein.

According to additional aspects, base station 504 can comprise a multi-node management apparatus 512 that is configured to coordinate wireless service by relay node 502 and one or more additional relays (not depicted) for the one or more UEs. To accomplish the coordinated wireless service, multi-node management apparatus 512 can send a resource and UE assignment schedule 512A to relay node 502. Resource and UE assignment schedule 512A specifies a common set of wireless resources for data traffic conducted by the one or more UEs on access channels provided by relay node 502 and the one or more additional relays. In at least one aspect, multi-node management apparatus 512 can further provide a UE/data stream assignment 512B that specifies respective channels, traffic or data streams to be handled by relay node 502 and the one or more additional relays in a coordinated fashion. The coordinated fashion can comprise cell-splitting assignments, multi-antenna assignments, or the like, as described herein. Particularly, it should be appreciated that the coordination of relay node 502 and the one or more additional relays can be implemented so as to provide improved performance on the common set of wireless resources, including improved SNR based on channel conditions between respective relays and respective UEs determined by node assignment apparatus 508, throughput or data rate gains achieved by multi-antenna assignments, and the like.

The aforementioned systems or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a wireless communication system could include base station 102 coupled with node assignment apparatus 204 and multi-node management apparatus 304, and wireless nodes 404A-404C communicatively coupled with UEs 402A-402B, or a different combination of these or other entities. Sub-modules could also be implemented as modules communicatively coupled to other modules rather than included within parent modules. Additionally, it should be noted that one or more modules could be combined into a single module providing aggregate functionality. For instance, mediation module 216 can include distribution module 212, or vice versa, to facilitate selecting one of multiple wireless nodes to serve a particular UE and to distribute the selection to the multiple wireless nodes, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 6:
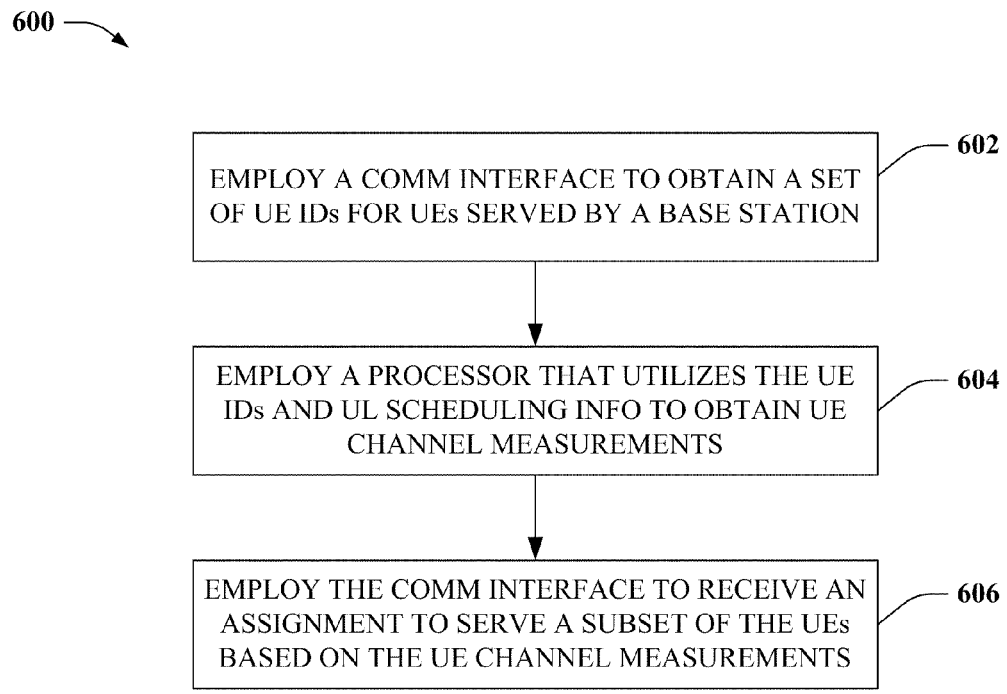
FIG. 6 illustrates a flowchart of a sample methodology for identifying preferred access channels provided by a set of transparent relays.

FIG. 6 illustrates a flowchart of an example methodology 600 according to particular aspects of the subject disclosure. At 602, method 600 can comprise employing a communication interface to obtain a set of UE IDs for a set of UEs served by a base station. Obtaining the set of UE IDs can include, for instance, receiving an access request transmission, pilot signal transmission, or the like, from respective UEs of the set of UEs and extracting respective UE IDs from the respective transmissions. Alternatively, according to another aspect, obtaining the set of UE IDs further comprises receiving from the base station a media access control identifier, an international mobility identifier, a radio temporary network identifier (RNTI), a control RNTI, or a mobile identifier for respective UEs of the set of UEs. In this latter aspect, the set of UE IDs is explicitly transmitted by the base station and received at the communication interface.

At 604, method 600 can comprise employing a signal processor (e.g., a receiver, demodulator and data processor) that utilizes the set of UE IDs and UL scheduling information for the set of UEs to obtain respective UE channel measurements. In one aspect, obtaining the UL scheduling information for the set of UEs further comprises receiving from the base station a schedule of sounding reference signal transmissions, or a schedule of UL demodulation reference signal transmissions for respective subsets of the set of UEs. In a further aspect, obtaining respective UE channel measurements further comprises measuring a set of UL signals of a subset of the set of UEs that are transmitted in accordance with the UL scheduling information. In this case, method 600 can further comprise forwarding results of the measuring the set of UL signals to the base station.

At 606, method 600 can comprise employing the communication interface for receiving an assignment to provide wireless service to a subset of the set of UEs based at least in part on one or more of the UE channel measurements. According to a particular aspect, receiving the assignment to provide wireless service to the subset of the set of UEs is based at least in part on the results of the measuring the set of UL signals. As a specific example, the assignment can be an assignment that is based on a plurality of independent measurements of the set of UL signals performed by respective relay nodes associated with the base station. In this case, the assignment can further be based on which of a subset of the relay nodes provided preferred service for the one or more of the subset of the set of UEs. In at least one additional aspect, the assignment comprises an instruction for a plurality of relay nodes to serve the one or more of the subset of the set of UEs utilizing an incremental redundancy policy. In this aspect, the incremental redundancy policy can be a policy that includes a correlation of particular channels or particular traffic to respective ones of the plurality of relay nodes for decoding, signal conditioning, and retransmitting to the one or more of the subset of the set of UEs.

In another aspect of the subject disclosure, the assignment can identify particular relay nodes for serving the subset of the set of UEs. In this aspect, the assignment at least one of: allocates one or more pico cells to serve the subset of the set of UEs, allocates one or more remote radio heads to serve the subset of the set of UEs, allocates one or more smart repeaters to serve the subset of the set of UEs, allocates one or more incremental redundancy relays to serve the subset of the set of UEs, or a suitable combination thereof.

Figure 7:
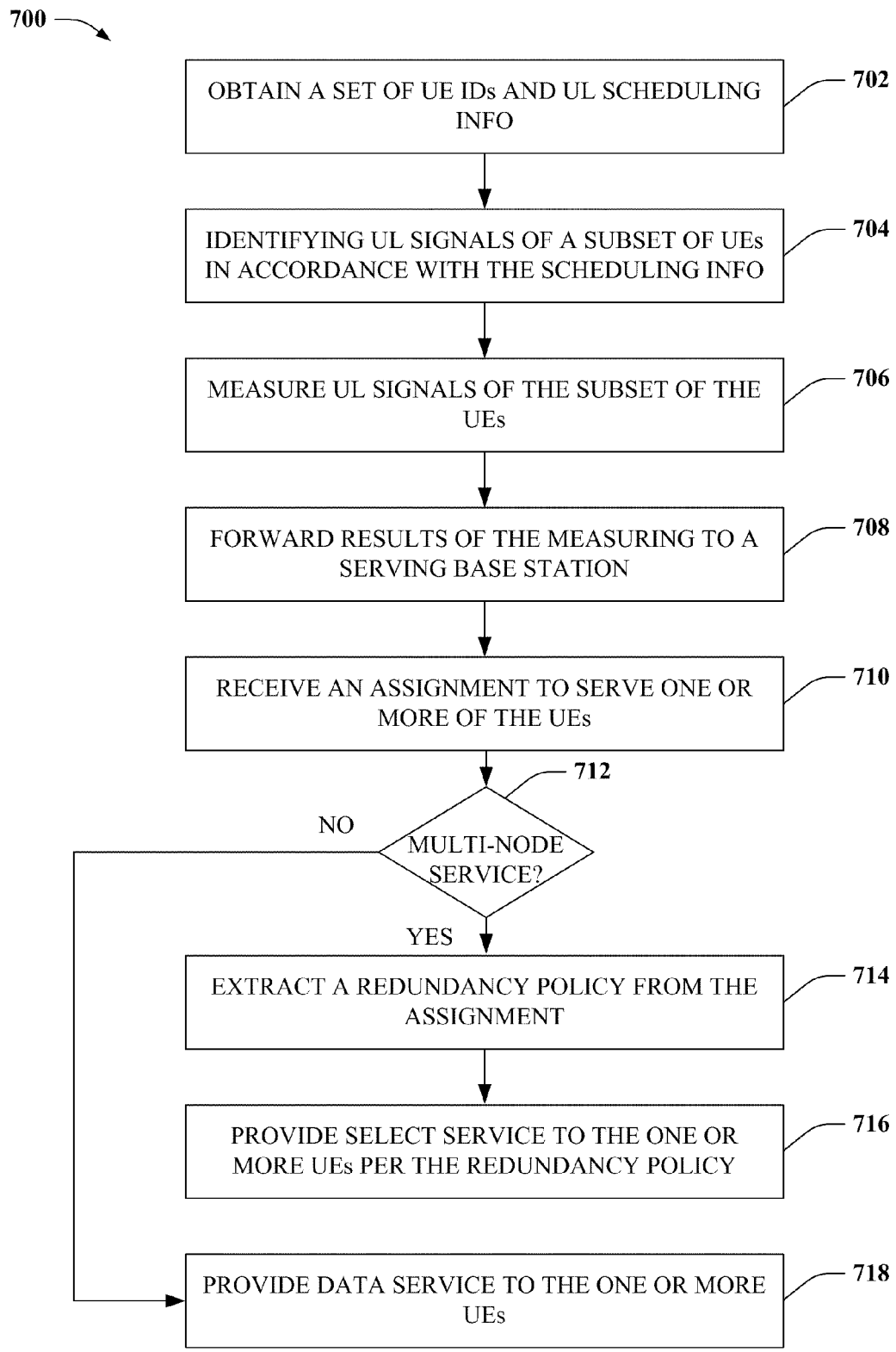
FIG. 7 depicts a flowchart of an example methodology for traffic distribution among a plurality of wireless nodes according to certain aspects.

FIG. 7 illustrates a flowchart of a sample methodology 700 according to yet other aspects of the subject disclosure. At 702, method 700 can comprise obtaining a set of UE IDs and UL scheduling information for respective UEs of a set of UEs. At 704, method 700 can comprise identifying UL signals of a subset of the set of UEs in accordance with the scheduling information. At 706, method 700 can comprise measuring the UL signals of the subset of the set of UEs to obtain UL channel measurements pertaining to the UL signals. At 708, method 700 can comprise forwarding results of the measuring to a serving base station. At 710, method 700 can comprise receiving an assignment to serve one or more of the UEs, wherein the assignment and service is based at least in part on the results of the measuring. Additionally, at 712, method 700 can make a determination as to whether the assignment specifies a multi-node service for at least one of the one or more of the UEs. If the assignment specifies a multi-node service, method 700 can proceed to 714; otherwise method 700 proceeds to 718.

At 714, method 700 can comprise extracting a redundancy policy from the assignment. At 716, method 700 can comprise providing select wireless service to the one or more UEs as specified within the redundancy policy. For instance, the redundancy policy can specify a portion of traffic of the one or more UEs associated with the select wireless service. Suitable portions of traffic can comprise providing control traffic service or data traffic service, providing service to one or more particular types of traffic (e.g., voice traffic, VoIP traffic, streaming media traffic, web browsing traffic, application-specific traffic, and so on), or providing service for one or more particular data streams involving the one or more UEs. At 718, method 700 can comprise providing data service to the one or more UEs as specified by the assignment.

Figure 8:
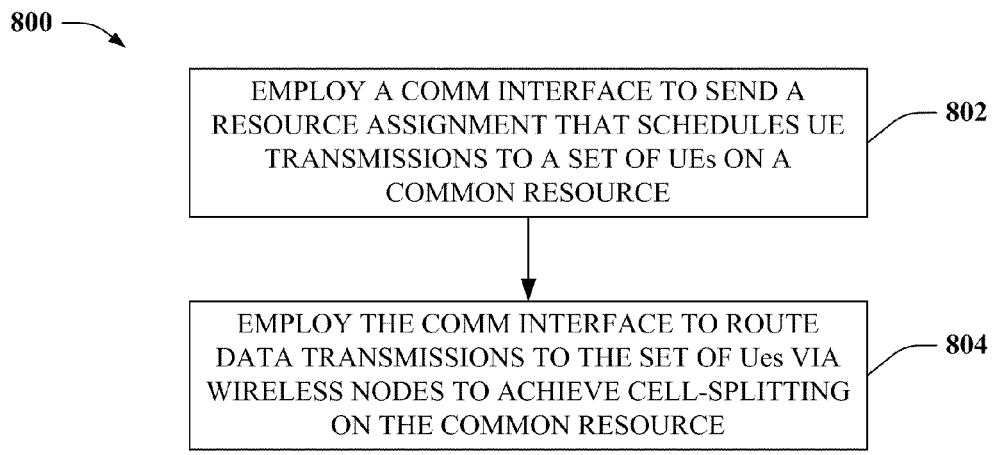
FIG. 8 illustrates a flowchart of a sample methodology for cell-splitting in a wireless environment according to other aspects.

FIG. 8 depicts a flowchart of an example methodology 800 according to one or more additional aspects of the subject disclosure. At 802, method 800 can comprise employing a wireless communication interface to wirelessly send a resource assignment directly to a set of UEs, wherein the resource assignment schedules a transmission for each of the set of UEs on a common wireless resource. Particularly, the common wireless resource can specify one or more frequency bands, one or more tones, one or more codes, etc., within a single transmission time slot or set of transmission time slots (e.g., a single subframe). Additionally, at 804, method 800 can comprise employing the wireless communication interface to route data transmissions to or from the set of UEs via one or more wireless nodes to achieve a cell-splitting gain at least on the common wireless resource for the data transmissions.

In one aspect of the subject disclosure, method 800 can further comprise employing a common UL wireless resource for the common wireless resources, wherein the data transmissions are received from the set of UEs via the one or more wireless nodes and the cell-splitting gain is observed on the common UL wireless resource. In an alternative aspect, method 800 can instead comprise routing a DL data transmission on a common DL wireless resource from respective ones of the one or more wireless nodes to achieve a DL cell-splitting gain on the common DL wireless resource.

According to an additional aspect, method 800 can further comprise employing respective wireless relays for routing a DL and an UL data transmission for each UE of the set of UEs. Alternatively, method 800 can instead comprise employing a plurality of wireless relays for routing the DL or the UL data transmission for at least one UE of the set of UEs. In the latter aspect, method 800 can provide multi-antenna DL transmission or reception for the at least one UE of the set of UEs, to achieve throughput or data rate gains available with multi-antenna wireless communication.

According to still other aspects, method 800 can additionally comprise increasing DL transmit range of the one or more wireless nodes by causing a base station to blank a set of DL wireless resources employed by the one or more wireless nodes. Particularly, the set of DL wireless resources can include wireless resources that are concurrent with the common wireless resource. In an alternative or additional aspect, method 800 can comprise increasing UL transmit range of at least one of the set of UEs by instructing at least one additional UE of the set of UEs to blank a set of UL wireless resources employed by the at least one of the set of UEs. Similar to the DL wireless resources, above, the UL transmit range can be increased where the set of UL wireless resources blanked by the at least one additional UE of the set of UEs is concurrent with the common wireless resource.

In another aspect, method 800 can comprise assigning respective scrambling codes to a subset of the set of UEs to facilitate distinguishing between respective data transmissions of a plurality of the data transmissions sent concurrently on the common wireless resource. In this aspect, assigning respective scrambling codes can further comprise deriving the scrambling codes from a set of predetermined scrambling codes, or generating the scrambling codes as a function of an identifier unique to respective UEs of the subset of the set of UEs. As a sub-aspect of the foregoing, assigning the scrambling codes can further comprise at least one of: sending a scrambling code seed or seeding function to respective UEs of the subset of the set of UEs to enable generation of one of the scrambling codes by the respective UEs, utilizing a physical layer or layer two control channel to transmit an assignment grant that comprises one or more of the scrambling codes, or employing layer three signaling to send the scrambling codes explicitly to one or more UEs of the subset of the set of UEs, or a suitable combination thereof.

In still other aspects of the subject disclosure, method 800 can further comprise facilitating obtaining CQI information pertaining to a set of relay channels between the one or more wireless nodes and the set of UEs. Particularly, obtaining CQI information can comprise employing TDD channel reciprocity for respective relay channels of the set of relay channels to estimate respective pathlosses to respective ones of the one or more wireless nodes, in one instance. In an alternative instance, however, obtaining the CQI information can instead comprise analyzing a low reuse relay-specific CQI reference signal transmitted by a subset of the set of UEs to estimate achievable CQI for respective access channels associated with the subset of the set of UEs.

According to one additional aspect, method 800 can comprise facilitating power control for one or more UEs of the set of UEs. For instance, facilitating power control can comprise obtaining an UL signal measurement from at least one of the one or more wireless nodes via a wired or wireless backhaul link. Additionally, facilitating the power control can also comprise analyzing the UL signal measurement to derive a set of UL power controls for one or more UEs of the set of UEs served by the at least one of the one or more wireless nodes. Once the set of UL power controls are derived, method 800 can then issue UL power control commands to the one or more UEs via the at least one of the one or more wireless nodes based on the set of UL power controls.

Figure 9:
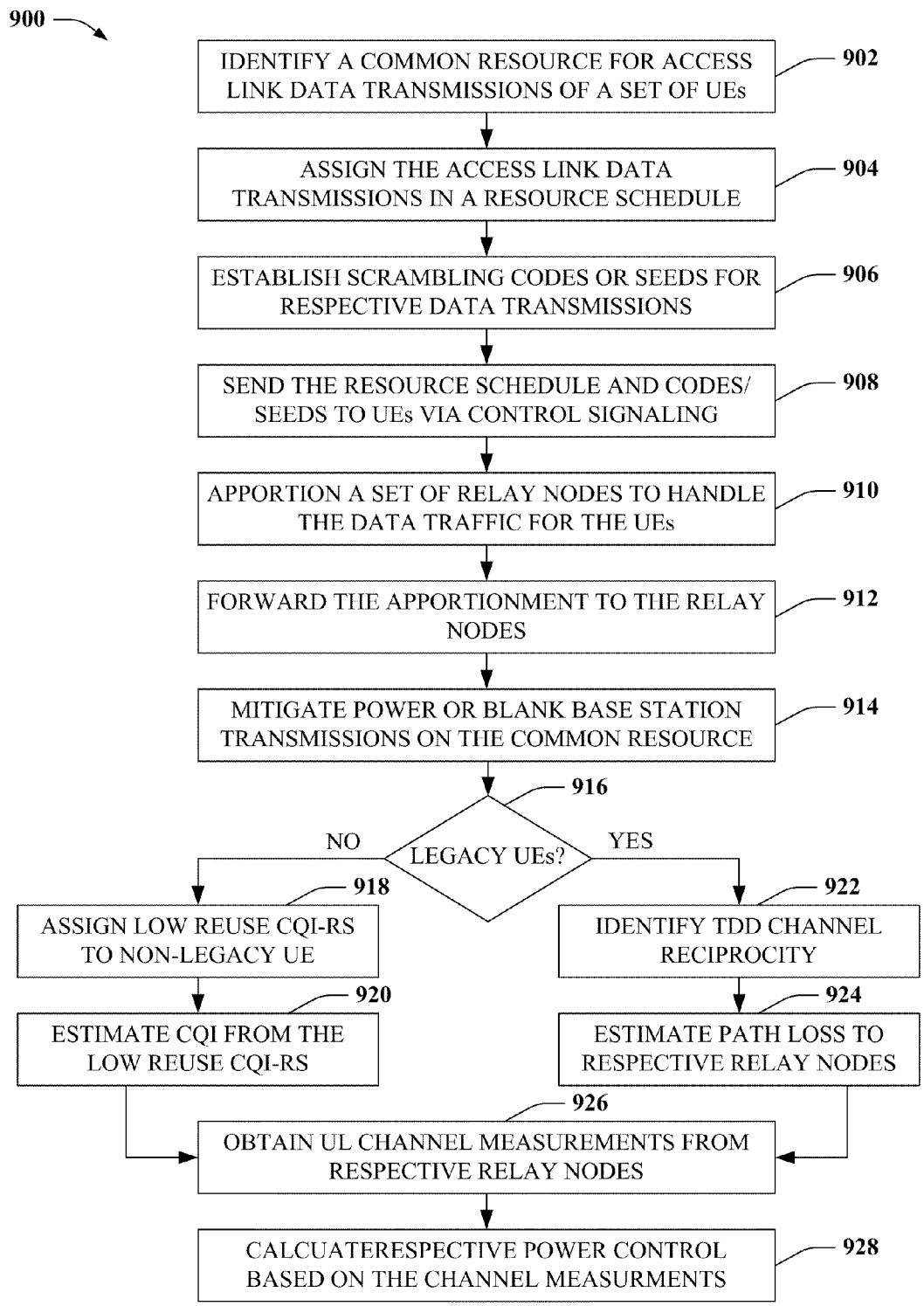
FIG. 9 depicts a flowchart of an example methodology providing traffic apportionment and range boosting for wireless communication utilizing relay nodes.

FIG. 9 illustrates a flowchart of a sample methodology 900 according to yet other aspects of the subject disclosure. At 902, method 900 can comprise identifying a common resource for access link data transmissions of a set of UEs. At 904, method 900 can comprise assigning the access link data transmissions in a resource schedule. Further, at 906, method 900 can comprise establishing scrambling codes or scrambling seeds for respective data transmissions and, at 908, sending the resource schedule and scrambling codes/scrambling seeds directly to a set of UEs via control signaling on a DL control channel.

In addition to the foregoing, at 910, method 900 can comprise apportioning a set of relay nodes to handle data traffic for the data transmissions of the set of UEs. At 912, method 900 can comprise forwarding the apportioning to respective relay nodes of the set of relay nodes. At 914, method 900 can further comprise mitigating transmit power, or blanking transmissions, of a base station on the common resource.

At 916, a determination is made as to whether the set of UEs comprises a legacy UE that is not configured to identify or employ a low reuse CQI-RS. If no such UE is included in the set of UEs, method 900 proceeds to 918. Otherwise, method 900 proceeds to 922.

At 918, method 900 can comprise assigning a low reuse CQI-RS to non-legacy UEs of the set of UEs that are configured to employ the low reuse CQI-RS. At 920, method 900 can comprise receiving respective low reuse CQI-RS transmissions from the non-legacy UEs, and estimating respective CQI information from the respective low reuse CQI-RS transmission. From 920, method 900 proceeds to 926.

At 922, method 900 can comprise identifying TDD channel reciprocity for respective access channels coupling relay nodes of the set of relay nodes and UEs of the set of UEs. At 924, method 900 can comprise estimating respective path loss information from the TDD channel reciprocity for the respective access channels. At 926, method 900 can comprise obtaining UL channel measurements from respective relay nodes of the set of relay nodes. At 928, method 900 can comprise calculating respective power controls for respective relay nodes or respective UEs of the set of UEs based at least in part on the UL channel measurements, respective CQI information or respective path loss information, or a suitable combination thereof. The respective power controls can then be distributed among the relay nodes and UEs of the set of UEs for subsequent transmissions.

Figure 10:
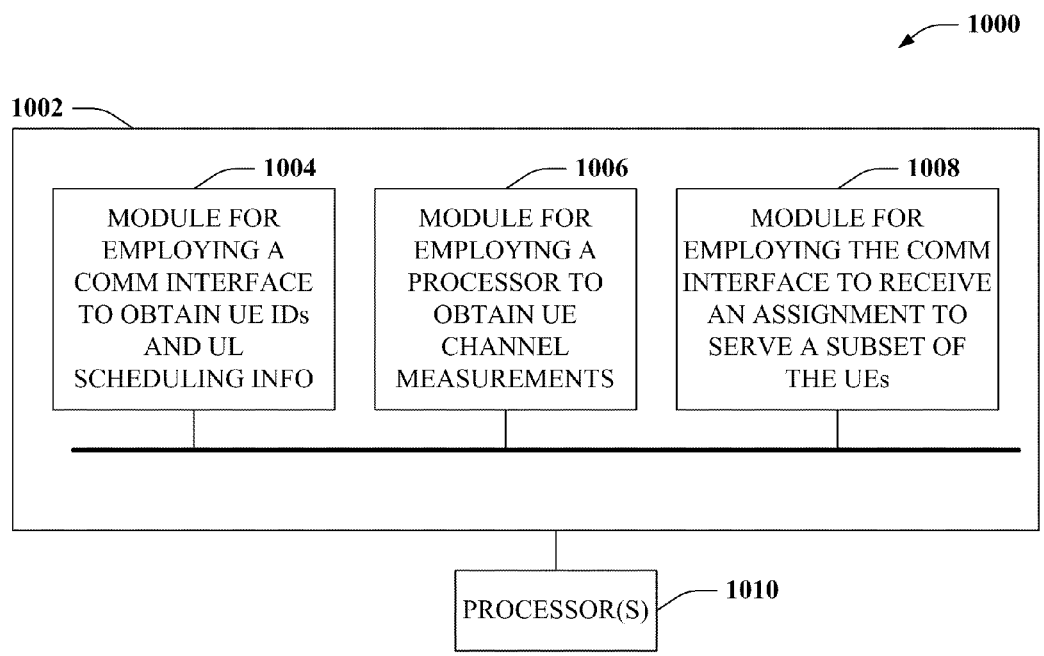
FIG. 10 illustrates a block diagram of a sample system that provides multi-node traffic management for relay nodes employed in wireless communication.
Figure 11:
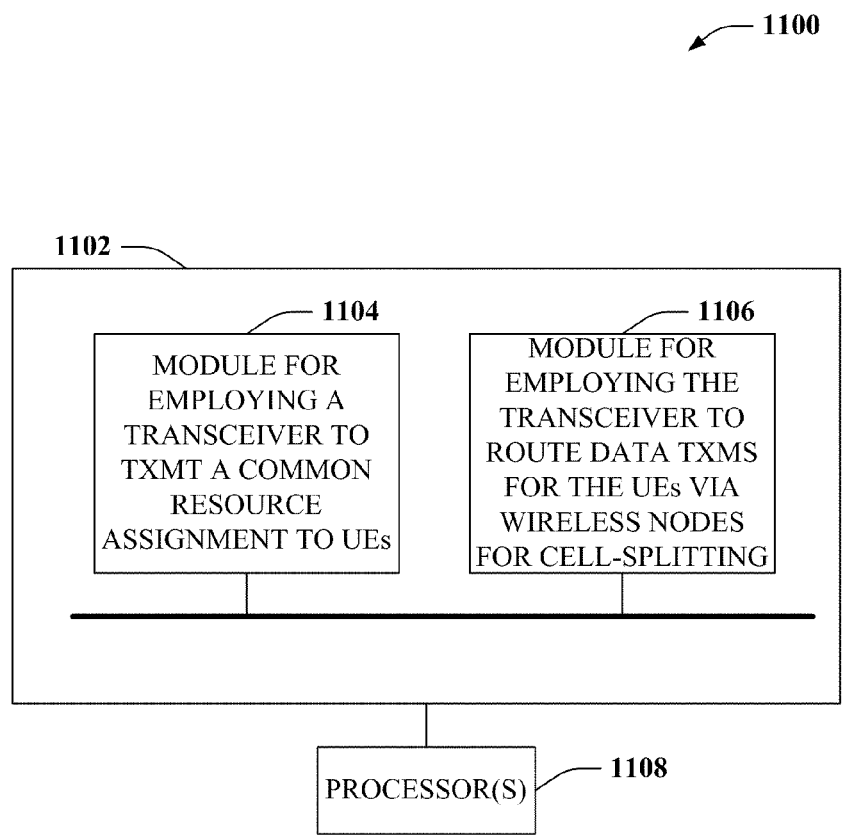
FIG. 11 depicts a block diagram of an example system that provides cell-splitting and range boosting for relay nodes in wireless communication.

FIGS. 10 and 11 illustrate respective example apparatuses 1000, 1100 for implementing multi-node assignment and multi-node cell-splitting, respectively in wireless communications according to aspects of the subject disclosure. For instance, apparatuses 1000, 1100 can reside at least partially within a wireless communication network and/or within a wireless receiver such as a node, base station, access point, user terminal, personal computer coupled with a mobile interface card, or the like. It is to be appreciated that apparatuses 1000, 1100 are represented as including functional blocks, which can be functional blocks that represent functions implemented by a processor, software, or combination thereof (e.g., firmware).

Apparatus 1000 can comprise memory 1002 for storing modules or instructions configured to execute functions of apparatus 1000. Apparatus 1000 can further comprise a module 1004 for employing a communication interface to obtain a set of UE IDs for a set of UEs served by a base station associated with apparatus 1000. Additionally, apparatus 1000 can comprise a module 1006 for employing a signal processor 1010 that utilizes the set of UE IDs and UL scheduling information for the set of UEs to obtain respective UE channel measurements of access channels employed by respective UEs of the set of UEs. Moreover, apparatus 1000 can comprise a module 1008 for employing the communication interface for receiving an assignment to provide wireless service to a subset of the set of UEs based at least in part on one or more of the UE channel measurements.

Apparatus 1100 can comprise memory 1102 for storing modules or instructions configured to execute functions of apparatus 1100, including providing cell-splitting for wireless communication involving a set of UEs served by a set of relay nodes associated with apparatus 1100. In addition, apparatus 1100 can comprise a module 1104 for employing a wireless transceiver to transmit a resource assignment directly to the set of UEs, wherein the resource assignment schedules a transmission for reach of the set of UEs on a common wireless resource. Furthermore, apparatus 1100 can comprise a module 1106 for employing the wireless transceiver to route respective data transmissions of the set of UEs via one or more wireless nodes to achieve a cell-splitting gain for at least one of the data transmissions at least on the common wireless resource.

Figure 12:
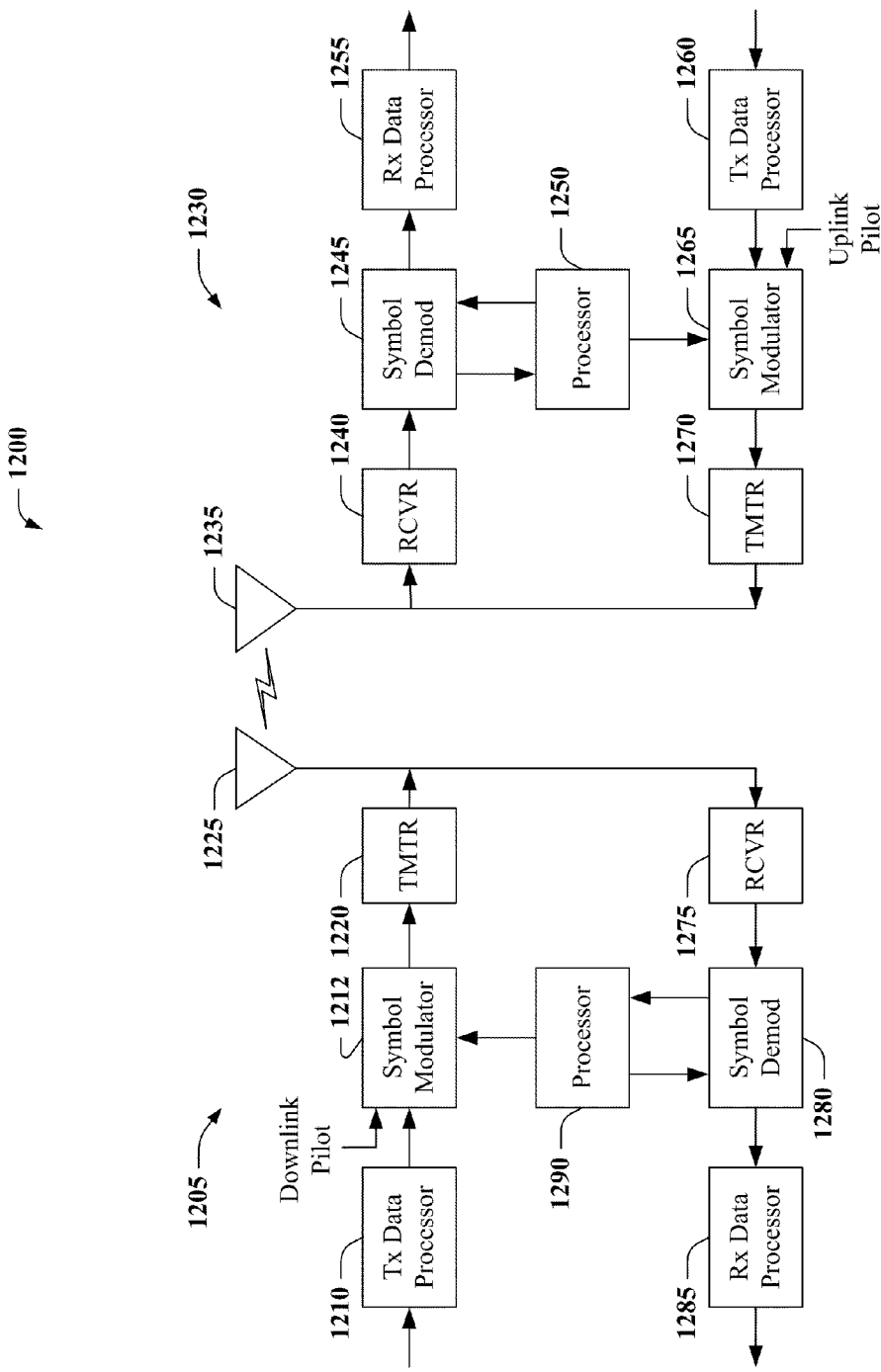
FIG. 12 depicts a block diagram of a sample wireless communications apparatus that can implement various aspects of the subject disclosure.

FIG. 12 depicts a block diagram of an example system 1200 that can facilitate wireless communication according to some aspects disclosed herein. On a DL, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and provides them to a transmitter unit (TMTR) 1220. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1220 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1225 to the terminals. At terminal 1230, an antenna 1235 receives the DL signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the DL from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the UL, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an UL signal, which is transmitted by the antenna 1235 to the access point 1205. Specifically, the UL signal can be in accordance with SC-FDMA requirements and can include frequency hopping mechanisms as described herein.

At access point 1205, the UL signal from terminal 1230 is received by the antenna 1225 and processed by a receiver unit 1275 to obtain samples. A symbol demodulator 1280 then processes the samples and provides received pilot symbols and data symbol estimates for the UL. An RX data processor 1285 processes the data symbol estimates to recover the traffic data transmitted by terminal 1230. A processor 1290 performs channel estimation for each active terminal transmitting on the UL. Multiple terminals can transmit pilot concurrently on the UL on their respective assigned sets of pilot sub-bands, where the pilot sub-band sets can be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1290 and 1250.

Figure 13:
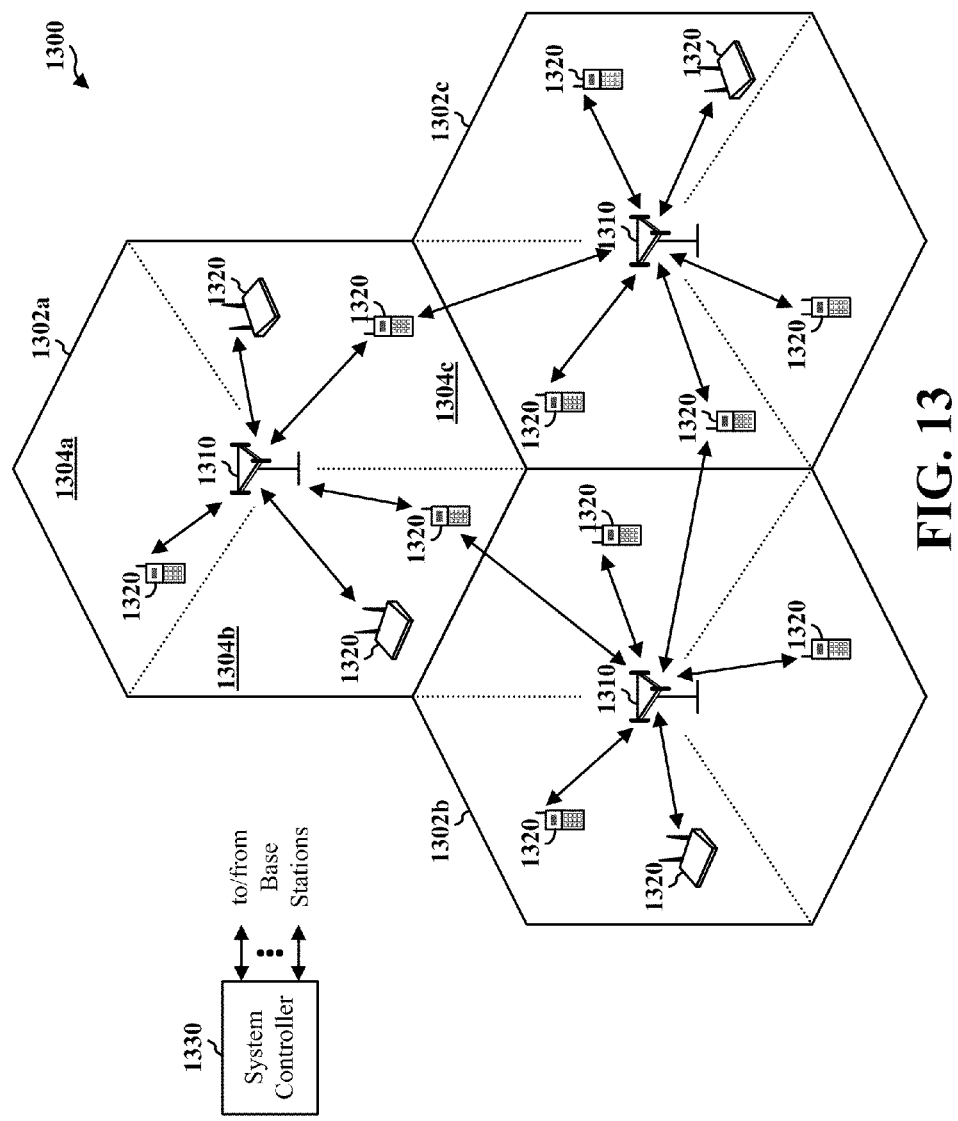
FIG. 13 illustrates a block diagram of a sample cellular environment for wireless communications according to further aspects.

FIG. 13 illustrates a wireless communication system 1300 with multiple base stations (BSs) 1310 (e.g., wireless access points, wireless communication apparatus) and multiple terminals 1320 (e.g., ATs), such as can be utilized in conjunction with one or more aspects. A BS 1310 is generally a fixed station that communicates with the terminals and can also be called an access point, a Node B, or some other terminology. Each BS 1310 provides communication coverage for a particular geographic area or coverage area, illustrated as three geographic areas in FIG. 13, labeled 1302*a*, 1302*b*, and 1302*c*. The term "cell" can refer to a BS or its coverage area depending on the context in which the term is used. To improve system capacity, a BS geographic area/coverage area can be partitioned into multiple smaller areas (e.g., three smaller areas, according to cell 1302*a* in FIG. 13), 1304*a*, 1304*b*, and 1304*c*. Each smaller area (1304*a*, 1304*b*, 1304*c*) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1320 are typically dispersed throughout the system, and each terminal 1320 can be fixed or mobile. Terminals 1320 can also be called a mobile station, user equipment, a user device, wireless communication apparatus, an access terminal, a user terminal or some other terminology. A terminal 1320 can be a wireless device, a cellular phone, a personal digital assistant (PDA), a wireless modem card, and so on. Each terminal 1320 can communicate with zero, one, or multiple BSs 1310 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1330 couples to base stations 1310 and provides coordination and control for BSs 1310. For a distributed architecture, BSs 1310 can communicate with one another as needed (e.g., by way of a wired or wireless backhaul network communicatively coupling the BSs 1310). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 14:
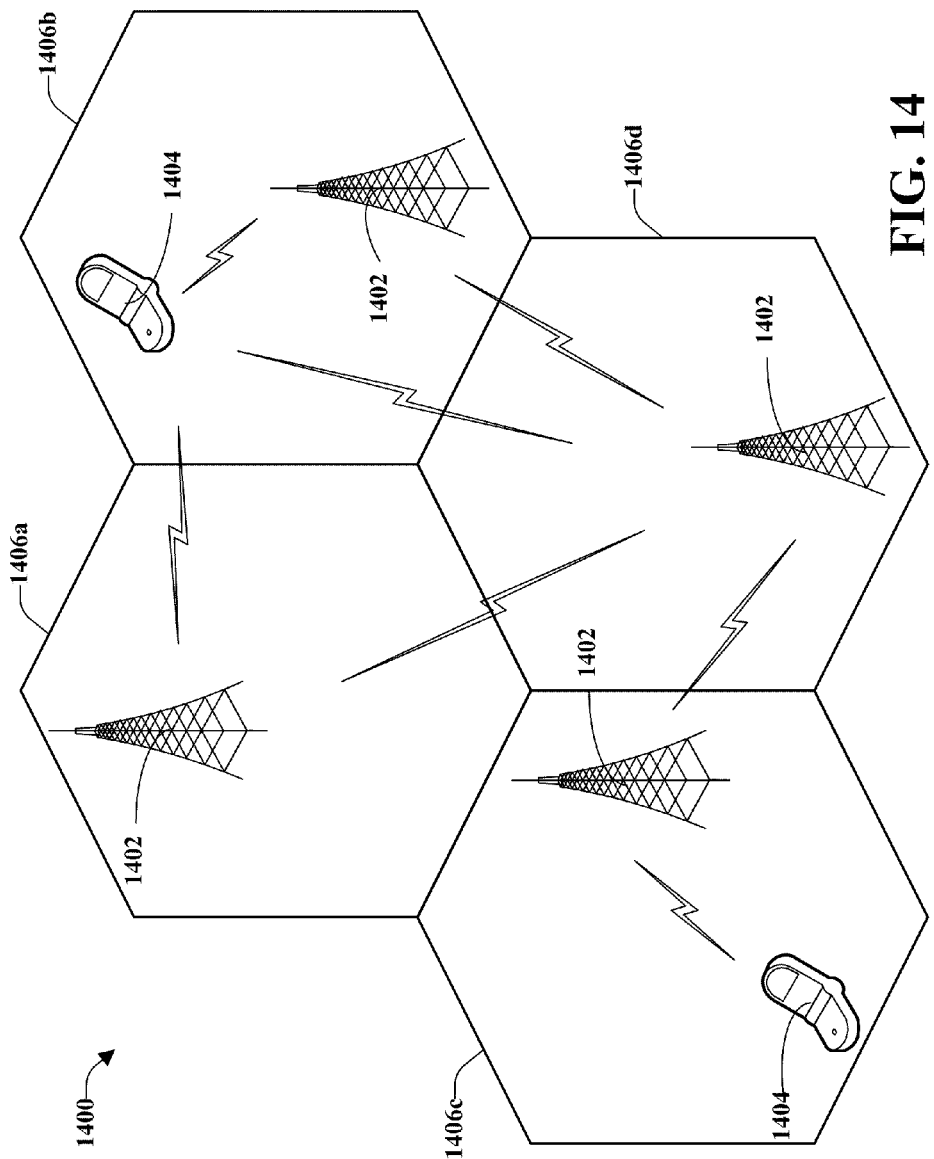
FIG. 14 depicts a block diagram of an example cell-based wireless communication arrangement suitable for one or more disclosed aspects.

FIG. 14 is an illustration of a planned or semi-planned wireless communication environment 1400, in accordance with various aspects. Wireless communication environment 1400 can comprise one or more BSs 1402 in one or more cells and/or sectors that receive, transmit, repeat, etc., wireless communication signals to each other and/or to one or more mobile devices 1404. As illustrated, each BS 1402 can provide communication coverage for a particular geographic area, illustrated as four geographic areas, labeled 1406a, 1406b, 1406c and 1406d. Each BS 1402 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 12, supra), as will be appreciated by one skilled in the art. Mobile devices 1404 can be, for example, cellular phones, smart phones, laptops, handheld communication devices, handheld computing devices, satellite radios, global positioning systems, PDAs, or any other suitable device for communicating over wireless communication environment 1400. Wireless communication environment 1400 can be employed in conjunction with various aspects described herein in order to facilitate multi-node relay assignment and cell-splitting effects in wireless communication, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UT). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive ... ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication, comprising:
   receiving, from a base station at a relay node, a set of user equipment (UE) identifiers (IDs) for a set of UEs served by the base station;
   obtaining, at the relay node, UE channel measurements based at least in part on the set of UE IDs and uplink (UL) scheduling information for the set of UEs, the UL scheduling information sent to the set of UEs and obtained by the relay node transparently; and
   receiving, from the base station at the relay node, an assignment to provide wireless service to a subset of the set of UEs based at least in part on the UE channel measurements and whether a signal to be transmitted comprises voice information, data information, and control information, the assignment selecting a plurality of relay nodes to simultaneously provide wireless service to at least one UE of the subset of UEs when the UE channel measurements for each of the plurality of relay nodes is greater than a threshold, the assignment being based at least in part on an incremental redundancy policy comprising a correlation of the voice information, the data information, and the control information to the plurality of relay nodes, the correlation specified for decoding, signal conditioning, and retransmitting to the subset of the set of UEs.

2. The method of claim 1, wherein selection of the subset of the set of UEs for the assignment is based at least in part on differences in a characteristic of the UE channel measurements.

3. The method of claim 1, wherein obtaining the set of UE IDs further comprises receiving from the base station a media access control identifier, an international mobility identifier, a radio temporary network identifier (RNTI), a control RNTI, or a mobile identifier for UEs of the set of UEs.

4. The method of claim 1, wherein obtaining UE channel measurements further comprises measuring a set of UL signals of a subset of the set of UEs that are transmitted in accordance with the UL scheduling information.

5. The method of claim 4, further comprising forwarding results of the measuring the set of UL signals to the base station.

6. The method of claim 5, wherein receiving the assignment to provide wireless service to the subset of the set of UEs is based at least in part on the results of the measuring the set of UL signals.

7. The method of claim 6, wherein the assignment is based on a plurality of independent measurements of the set of UL signals performed by relay nodes associated with the base station, and further wherein the assignment is based on which of a subset of the plurality of relay nodes provides a preferred service for the subset of the set of UEs.

8. The method of claim 6, wherein the assignment comprises an instruction for the plurality of relay nodes to serve the subset of the set of UEs using the incremental redundancy policy.

9. The method of claim 1, wherein the assignment:
   allocates at least one pico cell to serve the subset of the set of UEs;
   allocates at least one remote radio head to serve the subset of the set of UEs;
   allocates at least one smart repeater to serve the subset of the set of UEs;
   allocates at least one incremental redundancy relay to serve the subset of the set of UEs; or
   a combination thereof.

10. A base station configured for wireless communication, comprising:
   a wireless communication interface configured for sending wireless signals to and receiving wireless signals from a set of user equipments (UEs) and a set of relay nodes associated with and located remotely from the base station;
   a memory unit for storing instructions configured to provide selective access point service for the set of UEs based on relative access channel measurements; and
   a data processor configured to execute modules to implement the instructions, the modules comprising:
      a distribution module configured to transmit an identifier (ID) and a transmission schedule for the set of UEs to the set of relay nodes transparently, with the set of UEs being unaware of the set of relay nodes; and
      a mediation module configured to select at least one of the set of relay nodes to serve the set of UEs based at least in part on UE signal measurements provided by the set of relay nodes and whether a signal to be transmitted comprises voice information, data information, and control information, a plurality of the set of relay nodes being selected to simultaneously provide wireless service to at least one UE of the set of UEs when the UE signal measurements for each of the plurality of the set of relay nodes is greater than a threshold; and an integration module configured to generate an incremental redundancy policy comprising an assignment of transmissions of the voice information, the data information, and the control information to the set of relay nodes, the incremental redundancy policy further comprising a correlation of the voice information, the data information, and the control information to the plurality of the set of relay nodes, the correlation specified for decoding, signal conditioning, and retransmitting to the set of UEs.

11. The base station of claim 10, further comprising an analysis module configured to identify whether a characteristic of the UE signal measurements varies among the UE signal measurements.

12. The base station of claim 11, wherein the characteristic comprises a signal strength characteristic, signal quality characteristic or a signal noise characteristic of the UE signal measurements.

13. The base station of claim 11, wherein the characteristic comprises signal strength, signal to noise ratio, rise over thermal, path loss, relative signal interference, achievable bandwidth, or achievable data rate, or a combination thereof.

14. The base station of claim 11, wherein the mediation module selects at least one relay node of the set of relay nodes to serve the set of UEs based on a value of the characteristic for a UE signal measurement provided by the at least one relay node.

15. The base station of claim 14, wherein the mediation module uses a selection policy stored in the memory unit for analyzing the value of the characteristic relative to values of the characteristic pertaining to UE signal measurements provided by other relay nodes of the subset of the set of relay nodes.

16. The base station of claim 15, wherein the selection policy defines a preferred ranking of values of the characteristic or a target value of the characteristic.

17. The base station of claim 16, wherein the mediation module selects the at least one relay node when the value of the characteristic is closest to the target value, or when the value of the characteristic is greater than the values of the characteristic based on the preferred ranking.

18. The base station of claim 11, wherein the mediation module further selects the plurality of the set of relay nodes to serve the set of UEs based on values of the characteristic associated with UE signal measurements of the plurality of relay nodes.

19. The base station of claim 10, wherein the redundancy policy includes the assignment of transmissions of the voice information, the data information, and the control information to relay nodes of the plurality of relay nodes based on characteristics of UE signal measurements provided by the plurality of relay nodes that are pertinent to the transmissions of voice information, data information, and control information.

20. An apparatus for wireless communication, comprising:
means for receiving, from a base station at a relay node, a set of user equipment (UE) identifiers (IDs) for a set of UEs served by the base station;
means for obtaining, at the relay node, UE channel measurements based at least in part on the set of UE IDs and uplink (UL) scheduling information for the set of UEs, the UL scheduling information sent to the set of UEs and obtained by the relay node transparently; and
means for receiving, from the base station at the relay node, an assignment to provide wireless service to a subset of the set of UEs based at least in part on the UE channel measurements and whether a signal to be transmitted comprises voice information, data information, and control information, the assignment selecting a plurality of relay nodes to simultaneously provide wireless service to at least one UE of the subset of UEs when the UE channel measurements for each of the plurality of relay nodes is greater than a threshold, the assignment being based on an incremental redundancy policy comprising a correlation of the voice information, the data information, and the control information to the plurality of relay nodes, the correlation specified for decoding, signal conditioning, and retransmitting to the subset of the set of UEs.

21. An apparatus for wireless communication, comprising:
a memory; and
at least one processor coupled to the memory, the at least one processor being configured:
to receive, from a base station at a relay node, a set of user equipment (UE) identifiers (IDs) for a set of UEs served by the base station;
to obtain, at the relay node, UE channel measurements based at least in part on the set of UE IDs and uplink (UL) scheduling information for the set of UEs, the UL scheduling information sent to the set of UEs and obtained by the relay node transparently; and
to receive, from the base station at the relay node, an assignment to provide wireless service to a subset of the set of UEs based at least in part on the UE channel measurements and whether a signal to be transmitted comprises voice information, data information, and control information, the assignment selecting a plurality of relay nodes to simultaneously provide wireless service to at least one UE of the subset of UEs when the UE channel measurements for each of the plurality of relay nodes is greater than a threshold, the assignment being based at least in part on an incremental redundancy policy comprising a correlation of the voice information, the data information, and the control information to the plurality of relay nodes for decoding, signal conditioning, and retransmitting to the subset of the set of UEs.

22. A non-transitory computer-readable medium having non-transitory program code recorded thereon, the program code comprising:
code to receive, from a base station at a relay node, a set of user equipment (UE) identifiers (IDs) for a set of UEs served by the base station;
code to obtain, at the relay node, UE channel measurements based at least in part on the set of UE IDs and uplink (UL) scheduling information for the set of UEs, the UL scheduling information sent to the set of UEs and obtained by the relay node transparently; and
code to receive, from the base station at the relay node, an assignment to provide wireless service to a subset of the set of UEs based at least in part on the UE channel measurements and whether a signal to be transmitted comprises voice information, data information, and control information, the assignment selecting a plurality of relay nodes to simultaneously provide wireless service to at least one UE of the subset of UEs when the UE channel measurements for each of the plurality of relay nodes is greater than a threshold, the assignment being based at least in part on an incremental redundancy policy comprising a correlation of the voice information, the data information, and the control information to the plurality of relay nodes, the correlation specified for decoding, signal conditioning, and retransmitting to the subset of the set of UEs.

23. A base station configured for wireless communication, comprising:
 a communication interface configured to send wireless signals to and receive wireless signals from a set of relay nodes and a set of user equipments (UEs);
 a memory unit for storing instructions configured to provide remote node-assisted wireless service for at least one of the set of UEs; and
 a data processor configured to execute modules that implement the instructions, the modules comprising:
  a scheduling module configured to generate a resource schedule for the set of UEs, the resource schedule allocating a set of wireless resources provided by the set of relay nodes to a plurality of transmissions of the set of UEs, the set of relay nodes being selected to simultaneously provide wireless service to at least one UE of the set of UEs based at least in part on UE channel measurements and whether a transmission comprises voice information, data information, and control information;
  a distribution module that transmits the resource schedule to the set of relay nodes transparently, with the set of UEs being unaware of the set of relay nodes; and
  an integration module configured to generate an incremental redundancy policy comprising an assignment of transmissions of the voice information, the data information, and the control information to the set of relay nodes, the incremental redundancy policy further comprising a correlation of the voice information, the data information, and the control information to the set of rely nodes, the correlation specified for decoding, signal conditioning, and retransmitting to the set of UEs.

24. The base station of claim 23, wherein the scheduling module assigns a transmission of the plurality of transmissions to a relay node of the set of relay nodes.

25. The base station of claim 23, wherein the scheduling module assigns a transmission of the plurality of transmissions to a plurality of relay nodes of the set of relay nodes.

26. The base station of claim 23, wherein the incremental redundancy policy includes an assignment of portions of a transmission to different relay nodes of the plurality of relay nodes.

27. The base station of claim 23, further comprising an attenuation module configured to reduce power of transmissions of the base station that are concurrent with the single set of wireless resources.

28. The base station of claim 27, wherein the scheduling module reschedules the transmissions of the base station that are concurrent with the single set of wireless resources, and the attenuation module reduces transmit power of the base station to zero during a transmission time slot that is concurrent with the single set of wireless resources.

29. The base station of claim 23, further comprising a coding module configured to facilitate orthogonal codes for at least one of the plurality of transmissions to differentiate transmissions between the set of relay nodes and the set of UEs.

30. The base station of claim 23, further comprising an estimation module that employs time division duplex (TDD) channel reciprocity to estimate path loss in wireless channels established between the set of relay nodes and the set of UEs.

31. The base station of claim 23, wherein:
 the scheduling module includes within the resource schedule a command for one of the set of UEs to transmit a low reuse node-specific channel quality indicator reference signal (CQI-RS); and
 the communication interface further configured to receive the low reuse node-specific CQI-RS on an uplink channel from the one of the set of UEs; and
 further comprising a measurement module configured to analyze the low reuse node-specific CQI-RS to estimate path loss for a wireless channel utilized by the one of the set of UEs.

32. The base station of claim 23, wherein at least one of the set of relay nodes comprises: a transparent repeater; a transparent wireless relay; a transparent pico cell; a remote radio head; a smart repeater; an incremental redundancy relay; or a combination thereof.

33. An apparatus at a base station configured for wireless communication, comprising:
 means for sending wireless signals to and receiving wireless signals from a set of relay nodes and a set of user equipments (UEs);
 means for generating a resource schedule for the set of UEs, the resource schedule allocating a set of wireless resources provided by the set of relay nodes to a plurality of transmissions of the set of UEs, the set of relay nodes being selected to simultaneously provide wireless service to at least one UE of the set of UEs based at least in part on UE channel measurements and whether a transmission comprises voice information, data information, and control information;
 means for generating an incremental redundancy policy comprising an assignment of transmissions of the voice information, the data information, and the control information to the set of relay nodes, the redundancy policy further comprising a correlation of the voice information, the data information, and the control information to the set of relay nodes, the correlation specified for decoding, signal conditioning, and retransmitting to the set of UEs; and
 means for transmitting the resource schedule to the set of relay nodes transparently, with the set of UEs being unaware of the set of relay nodes.

34. A non-transitory computer-readable medium having non-transitory program code recorded thereon for a base station, the program code comprising:
 program code to send wireless signals to and receive wireless signals from a set of relay nodes and a set of user equipments (UEs);
 program code to generate a resource schedule for the set of UEs, the resource schedule allocating a set of wireless resources provided by the set of relay nodes to a plurality of transmissions of the set of UEs, the set of relay nodes being selected to simultaneously provide wireless service to at least one UE of the set of UEs based at least in part on UE channel measurements and whether a transmission comprises voice information, data information, and control information;

program code to generate an incremental redundancy policy comprising an assignment of transmissions of the voice information, the data information, and the control information to the set of relay nodes, the incremental redundancy policy further comprising a correlation of the voice information, the data information, and the control information to the set of relay node, the correlation specified for decoding, signal conditioning, and retransmitting to the set of UEs; and program code to transmit the resource schedule to the set of relay nodes transparently, with the set of UEs being unaware of the set of relay nodes.

35. A method for wireless communication at a base station, comprising:

sending wireless signals to and receiving wireless signals from a set of relay nodes and a set of user equipments (UEs);

generating a resource schedule for the set of UEs, the resource schedule allocating a set of wireless resources provided by the set of relay nodes to a plurality of transmissions of the set of UEs, the set of relay nodes being selected to simultaneously provide wireless service to at least one UE of the set of UEs based at least in part on UE channel measurements and whether a transmission comprises voice information, data information, and control information;

generating an incremental redundancy policy comprising an assignment of transmissions of the voice information, the data information, and the control information to the set of relay nodes, the incremental redundancy policy comprising a correlation of the voice information, the data information, and the control information to the set of relay nodes, the correlation specified for decoding, signal conditioning, and retransmitting to the set of UEs; and transmitting the resource schedule to the set of relay nodes transparently, with the set of UEs being unaware of the set of relay nodes.

36. The method of claim 35, further comprising assigning a transmission of the plurality of transmissions to a relay node of the set of relay nodes.

37. The method of claim 35, further comprising assigning a transmission of the plurality of transmissions to a plurality of the set of relay nodes.

38. The method of claim 35, wherein the incremental redundancy policy includes an assignment of portions of a transmission to different relay nodes of the plurality of relay nodes.

39. The method of claim 35, further comprising reducing a power of transmissions that are concurrent with a single set of wireless resources.

40. The method of claim 39, further comprising: rescheduling the transmissions that are concurrent with the single set of wireless resources; and reducing a transmit power to zero during a transmission time slot that is concurrent with the single set of wireless resources.

41. The method of claim 35, further comprising differentiating transmissions between the set of relay nodes and the set of UEs via orthogonal codes for one or more of the plurality of transmissions.

42. The method of claim 35, further comprising estimating a path loss in wireless channels established between the set of relay nodes and the set of UEs via a time division duplex (TDD) channel reciprocity.

43. The method of claim 35, further comprising:

instructing one of the set of UEs to transmit a low reuse node-specific channel quality indicator reference signal (CQI-RS);

receiving the low reuse node-specific CQI-RS on an uplink channel from the one of the set of UEs; and analyzing the low reuse node-specific CQI-RS to estimate path loss for a wireless channel utilized by the one of the set of UEs.

44. The method of claim 35, wherein at least one of the set of relay nodes comprises a transparent repeater, a transparent wireless relay, a transparent pico cell, a remote radio head, a smart repeater, an incremental redundancy relay, or a combination thereof.

* * * * *